(12) United States Patent
Bucevschi et al.

(10) Patent No.: US 12,129,419 B2
(45) Date of Patent: Oct. 29, 2024

(54) POLYMERIC COMPOSITION FOR USE AS SOIL CONDITIONER WITH IMPROVED WATER ABSORBENCY DURING WATERING OF THE AGRICULTURAL CROPS

(71) Applicant: POLYGREEN LTD, Tel Aviv (IL)

(72) Inventors: Mircea Dan Bucevschi, Rehovot (IL); Zwika Meiri, Netanya (IL); Shai Shahal, Tel Aviv (IL)

(73) Assignee: POLYGREEN LTD, Tel Aviv (IL)

( * ) Notice: Subject to any disclaimer, the term of this patent is extended or adjusted under 35 U.S.C. 154(b) by 841 days.

(21) Appl. No.: 17/293,297

(22) PCT Filed: Nov. 12, 2019

(86) PCT No.: PCT/US2019/060972
§ 371 (c)(1),
(2) Date: May 12, 2021

(87) PCT Pub. No.: WO2020/102227
PCT Pub. Date: May 22, 2020

(65) Prior Publication Data
US 2022/0025263 A1  Jan. 27, 2022

Related U.S. Application Data

(60) Provisional application No. 62/760,715, filed on Nov. 13, 2018.

(51) Int. Cl.
*C09K 17/32* (2006.01)
*B01J 20/24* (2006.01)
(Continued)

(52) U.S. Cl.
CPC .............. *C09K 17/32* (2013.01); *B01J 20/24* (2013.01); *B01J 20/261* (2013.01);
(Continued)

(58) Field of Classification Search
None
See application file for complete search history.

(56) References Cited

U.S. PATENT DOCUMENTS 2,479,522 A   8/1949  Strain
2,640,819 A   6/1953  Barrett
(Continued)

FOREIGN PATENT DOCUMENTS

CN   1175216 A    3/1998
CN   106146156 A  11/2016
(Continued)

OTHER PUBLICATIONS

Capezza Villa AJ, "Novel superabsorbent materials obtained from plant proteins" 2017. p. 28, Capezza Villa AJ. Dec. 31, 2017.
(Continued)

*Primary Examiner* — Wayne A Langel
(74) *Attorney, Agent, or Firm* — BROWDY AND NEIMARK, PLLC

(57) ABSTRACT

The present invention relates to polymeric soil conditioner Absorbency stability as a new water absorbing polymeric material and a process for the production of water absorbing materials consisting of a combination of synthetic polymers and biopolymers, with an improved high water absorbency at repeated watering, capable to reduce the effect of accumulation of salts in polymeric matrix as of multiple cycles of swelling-deswelling that occurs during all period of living of vegetable culture, by decreasing of crosslinking density of three dimensional network of the material caused by biochemical processes that developed in polymeric gels.

14 Claims, 7 Drawing Sheets

(51) Int. Cl.
*B01J 20/26* (2006.01)
*B01J 20/28* (2006.01)
*C05F 11/00* (2006.01)
*C05G 3/80* (2020.01)
*C09K 17/22* (2006.01)

(52) U.S. Cl.
CPC ... *B01J 20/28004* (2013.01); *B01J 20/28016* (2013.01); *C05F 11/00* (2013.01); *C05G 3/80* (2020.02); *C09K 17/22* (2013.01)

(56) References Cited

U.S. PATENT DOCUMENTS

| | | |
|---|---|---|
| 2,855,387 A | 10/1958 | Barrett |
| 2,988,539 A | 6/1961 | Cohen et al. |
| 2,996,480 A | 8/1961 | Mulloy et al. |
| 3,393,168 A | 7/1968 | Johnson et al. |
| 3,514,419 A | 5/1970 | Durlow et al. |
| 3,926,891 A | 12/1975 | Gross et al. |
| 3,933,747 A | 1/1976 | Nowak et al. |
| 3,948,866 A | 4/1976 | Pennewiss et al. |
| 3,954,721 A | 5/1976 | Gross |
| 3,959,569 A | 5/1976 | Burkholder, Jr. |
| 3,966,902 A | 6/1976 | Chromecek |
| 3,980,663 A | 9/1976 | Gross |
| 3,983,095 A | 9/1976 | Bashaw et al. |
| 3,983,271 A | 9/1976 | Pangle, Jr. et al. |
| 3,989,586 A | 11/1976 | Bashaw et al. |
| 3,993,553 A | 11/1976 | Assarsson et al. |
| 3,997,484 A | 12/1976 | Weaver et al. |
| 4,034,014 A | 7/1977 | Curtis, Jr. et al. |
| 4,036,788 A | 7/1977 | Steckler |
| 4,041,228 A | 8/1977 | Gross |
| 4,051,311 A | 9/1977 | Lee |
| 4,057,521 A | 11/1977 | Gross |
| 4,058,124 A | 11/1977 | Yen et al. |
| 4,066,584 A | 1/1978 | Allen et al. |
| 4,076,673 A | 2/1978 | Burkholder, Jr. |
| 4,076,917 A | 2/1978 | Swift et al. |
| 4,101,606 A | 7/1978 | Cenci et al. |
| 4,116,899 A | 9/1978 | Fanta et al. |
| 4,117,184 A | 9/1978 | Erickson et al. |
| 4,154,646 A | 5/1979 | Rave |
| 4,155,957 A | 5/1979 | Sasayama |
| 4,163,092 A | 7/1979 | Steckler |
| 4,167,464 A | 9/1979 | George |
| 4,210,489 A | 7/1980 | Markofsky |
| 4,238,374 A | 12/1980 | Durham et al. |
| 4,241,537 A | 12/1980 | Wood |
| 4,242,408 A | 12/1980 | Evani et al. |
| 4,251,643 A | 2/1981 | Harada et al. |
| 4,320,040 A | 3/1982 | Fujita et al. |
| 4,340,706 A | 7/1982 | Obayashi et al. |
| 4,389,513 A | 6/1983 | Miyazaki |
| 4,390,672 A | 6/1983 | von Bonin |
| 4,402,725 A | 9/1983 | Heller et al. |
| 4,418,163 A | 11/1983 | Murakami et al. |
| 4,468,343 A | 8/1984 | Butler et al. |
| 4,469,502 A | 9/1984 | Heller et al. |
| 4,483,950 A | 11/1984 | Fanta et al. |
| 4,500,670 A | 2/1985 | McKinley et al. |
| 4,537,590 A | 8/1985 | Pieniak et al. |
| 4,540,454 A | 9/1985 | Pieniak et al. |
| 4,573,988 A | 3/1986 | Pieniak et al. |
| 4,666,983 A | 5/1987 | Tsubakimoto et al. |
| 4,676,784 A | 6/1987 | Erdman et al. |
| 4,698,404 A | 10/1987 | Cramm et al. |
| 4,703,108 A | 10/1987 | Silver et al. |
| 4,731,067 A | 3/1988 | Le-Khac |
| 4,734,478 A | 3/1988 | Tsubakimoto et al. |
| 4,758,617 A | 7/1988 | Tanioku et al. |
| 4,771,105 A | 9/1988 | Shirai et al. |
| 4,820,773 A | 4/1989 | Alexander et al. |
| 4,824,901 A | 4/1989 | Alexander et al. |
| 4,855,179 A | 8/1989 | Bourland et al. |
| 4,861,539 A | 8/1989 | Allen et al. |
| 4,880,868 A | 11/1989 | Le-Khac |
| 4,888,238 A | 12/1989 | Katz et al. |
| 4,950,692 A | 8/1990 | Lewis et al. |
| 4,954,562 A | 9/1990 | Anderson |
| 4,962,172 A | 10/1990 | Allen et al. |
| 4,963,638 A | 10/1990 | Pazos et al. |
| 4,971,954 A | 11/1990 | Brodsky et al. |
| 5,002,986 A | 3/1991 | Fujiura et al. |
| 5,013,349 A | 5/1991 | Tanaka |
| 5,026,784 A | 6/1991 | Le-Khac |
| 5,115,011 A | 5/1992 | Harada et al. |
| 5,183,707 A | 2/1993 | Herron et al. |
| 5,221,787 A | 6/1993 | Robison et al. |
| 5,280,079 A | 1/1994 | Allen et al. |
| 5,312,661 A | 5/1994 | Suzuki et al. |
| 5,340,853 A | 8/1994 | Chmelir et al. |
| 5,382,270 A | 1/1995 | Graham et al. |
| 5,385,729 A | 1/1995 | Prencipe et al. |
| 5,413,747 A | 5/1995 | Akers et al. |
| 5,447,727 A | 9/1995 | Graham |
| 5,466,731 A | 11/1995 | Akers et al. |
| 5,525,682 A | 6/1996 | Nagatomo et al. |
| 5,567,478 A | 10/1996 | Houben et al. |
| 5,572,827 A | 11/1996 | Conrad |
| 5,645,542 A | 7/1997 | Anjur et al. |
| 5,693,707 A | 12/1997 | Cheng et al. |
| 5,698,074 A | 12/1997 | Barcus et al. |
| 5,703,186 A | 12/1997 | Sezi et al. |
| 5,712,316 A | 1/1998 | Dahmen et al. |
| 5,720,736 A | 2/1998 | Hatsuda et al. |
| 5,733,576 A | 3/1998 | Chmelir |
| 5,733,994 A | 3/1998 | Koepff et al. |
| 5,791,085 A | 8/1998 | Szmidt et al. |
| 5,827,259 A | 10/1998 | Laux et al. |
| 5,840,804 A | 11/1998 | Carl et al. |
| 5,846,214 A | 12/1998 | Makuuchi et al. |
| 5,847,089 A | 12/1998 | Damodaran et al. |
| 5,866,678 A | 2/1999 | Kajikawa et al. |
| 5,962,068 A | 10/1999 | Tsuchiya et al. |
| 5,986,042 A | 11/1999 | Irizato et al. |
| 5,997,791 A | 12/1999 | Chou et al. |
| 5,998,312 A | 12/1999 | Kroesbergen |
| 5,998,491 A | 12/1999 | Haar, Jr. |
| 5,998,492 A | 12/1999 | Haar, Jr. et al. |
| 6,060,557 A | 5/2000 | Dahmen et al. |
| 6,066,325 A | 5/2000 | Wallace et al. |
| 6,087,448 A | 7/2000 | Mitchell et al. |
| 6,150,495 A | 11/2000 | Chou et al. |
| 6,162,541 A | 12/2000 | Chou et al. |
| 6,241,713 B1 | 6/2001 | Gross et al. |
| 6,309,454 B1 | 10/2001 | Friedman et al. |
| 6,310,105 B1 | 10/2001 | Damodaran |
| 6,326,446 B2 | 12/2001 | Carter |
| 6,342,652 B1 | 1/2002 | Harada et al. |
| 6,376,618 B1 | 4/2002 | Mitchell et al. |
| 6,410,616 B1 | 6/2002 | Harada et al. |
| 6,417,425 B1 | 7/2002 | Whitmore et al. |
| 6,506,696 B2 | 1/2003 | Goldstein et al. |
| 6,630,422 B1 | 10/2003 | Sannino et al. |
| 6,645,407 B2 | 11/2003 | Kellenberger et al. |
| 6,660,819 B2 | 12/2003 | Chmelir et al. |
| 6,689,378 B1 | 2/2004 | Sun et al. |
| 6,710,141 B1 | 3/2004 | Heide et al. |
| 6,720,402 B2 | 4/2004 | Langer |
| 6,773,746 B1 | 8/2004 | Bell |
| 6,800,712 B2 | 10/2004 | Doane et al. |
| 6,821,331 B2 | 11/2004 | Damodaran |
| 6,833,488 B2 | 12/2004 | Bucevschi et al. |
| 7,009,020 B2 | 3/2006 | Doane et al. |
| 7,071,327 B2 | 7/2006 | Mensitieri et al. |
| 7,163,563 B2 | 1/2007 | Schwartz et al. |
| 7,166,356 B2 | 1/2007 | Flohr |
| 7,300,965 B2 | 11/2007 | Weerawarna et al. |
| 7,423,090 B2 | 9/2008 | Doane et al. |
| 7,423,106 B2 | 9/2008 | Doane et al. |
| 7,459,501 B2 | 12/2008 | Doane et al. |
| 7,985,819 B2 | 7/2011 | Bucevschi et al. |
| 8,013,083 B2 | 9/2011 | Kosover et al. |

(56) References Cited

U.S. PATENT DOCUMENTS

| | | | |
|---|---|---|---|
| 8,022,140 | B2 | 9/2011 | Tikart et al. |
| 8,378,022 | B2 | 2/2013 | Bucevschi et al. |
| 8,596,931 | B2 | 12/2013 | Nagashima et al. |
| 2002/0193516 | A1 | 12/2002 | Bucevschi et al. |
| 2003/0120231 | A1 | 6/2003 | Wang et al. |
| 2004/0054341 | A1 | 3/2004 | Kellenberger et al. |
| 2008/0200616 | A1 | 8/2008 | Tanizaki et al. |
| 2008/0227944 | A1 | 9/2008 | Ambrosio et al. |
| 2009/0306290 | A1 | 12/2009 | Bucevschi et al. |
| 2009/0324537 | A1 | 12/2009 | Bucevschi et al. |
| 2010/0139347 | A1 | 6/2010 | Barati et al. |
| 2010/0234233 | A1 | 9/2010 | Ambrosio et al. |
| 2012/0267570 | A1 | 10/2012 | Shi et al. |
| 2016/0316759 | A1* | 11/2016 | Bougoure .............. A01N 25/34 |
| 2017/0044711 | A1 | 2/2017 | Canepa |
| 2018/0354869 | A1 | 12/2018 | Zhu et al. |
| 2021/0147588 | A1 | 5/2021 | Bucevschi et al. |
| 2021/0187477 | A1 | 6/2021 | Bucevschi et al. |

FOREIGN PATENT DOCUMENTS

| | | |
|---|---|---|
| CN | 106348949 A | 1/2017 |
| EP | 0722971 B1 | 3/1993 |
| EP | 0722971 A2 | 7/1996 |
| EP | 2277557 | 6/2014 |
| GB | 929409 A | 6/1963 |
| JP | H06122708 A | 5/1994 |
| JP | 2004-339496 A | 12/2004 |
| JP | 2006008800 A | 1/2006 |
| WO | 2001030407 A1 | 5/2001 |
| WO | 2005/084724 | 9/2005 |
| WO | 2006069732 | 7/2006 |
| WO | 2007/115169 | 10/2007 |
| WO | 2009/014824 | 1/2009 |
| WO | 2008120742 A1 | 7/2010 |
| WO | 2011141526 A1 | 11/2011 |
| WO | 2016/090330 A1 | 6/2016 |
| WO | 2019195271 A1 | 10/2019 |
| WO | 2019195272 A1 | 10/2019 |

OTHER PUBLICATIONS

Bakass M., Mokhlisse A., Lallemant M. [2002 "Absorption and Desorption of Liquid Water by a Superabsorbent Polymer: Effect of Polymer in the Drying of the Soil and the Quality of Certain Plants" J Appl Polym Sci vol. 83: 234-243.

Akhter J., Mahmood K., Malik K.A.,. Mardan A, Ahmad M., Iqbal M.M, [2004] Effects of hydrogel amendment on water storage of sandy loam and loam soils and seedling growth of barley, wheat and chickpea Plant Soil Environ. vol. 50: 463-469.

Yangyuoru M., Boateng E., Adiku S.G. ,KAcquah D. [2006] "Effects of Natural and Synthetic Soil Conditioners on Soil Moisture Retention and Maize Yield" West Africa Journal of Applied Ecology (WAJAE),vol. 9 : 1-8.

Wang Y.T. , Greg L.L. [1989]. "Hydrophilic polymers—their response to soil amendments and effect on properties of a soilless potting mix". J. Amer. Soc. Hort. Sci. vol. 115 : 943-948.

Puoci F., Iemma F., Spizzirri U. G., Cirillo G., Curcio M., Picci N. [2008] "Polymer in Agriculture: a Review" Am. J. Agri. Biol. Sci., vol. 3 : 299-314.

El Hady O.A., Tayel M.Y. ,Lofty A.A. [1981]. Super gel as a soil conditioner. II. Its effects on plant growth, enzyme activity, water use efficiency and nutrient uptake. Acta Horticulturae vol. 19 : 257-265.

Milimouk I., Hecht A.M., Beysens D., Geissler E. [2001] "Swelling of neutralized polyelectrolyte gels" Polymer vol. 42 : 487-494.

Zohuriaan-Mehr M. J., Kabiri K. [2008] "Superabsorbent Polymer Materials: A Review " Iranian Polymer Journal vol. 17 : 451-477.

Preparation and Performance Study of Smart Hydrogel Based on Methyl Vinyl Ether-Maleic Acid Alternating Copolymer, Ma Xiao'e, China Doctoral Dissertations/Master's Theses Full-Text Database, Medicine/Health (Series E), 2017, No. 02, E079-24.

Xia Yuzheng and Chen Xiaonong, Fine Polymer Chemicals and Applications, Chemical Industry Press, pp. 101-104 (2000).

Enas M. Ahmed Hydrogel: Preparation, characterization and applications: A review, Journal of Advanced Research vol. 6, Issue 2, Mar. 2015, pp. 105-121.

Fidelia Nnadi and Chris Brave "Environmentally friendly superabsorbent polymers for water conservation in agricultural lands"— Journal of Soil Science and Environmental Management vol. 2(7), pp. 206-211, Jul. 2011.

Giuseppe Cannazza, Andrea Cataldo, Egidio De Benedetto, Christian Demitri , Marta Madaghiele and Alessandro Sannino "Experimental Assessment of the Use of a Novel Superabsorbent polymer (SAP) for the Optimization of Water Consumption in Agricultural Irrigation Process"—Water 2014, 6, 2056-2069.

Deniz Aydemir, Alper Kiziltas, Gokhan Gunduz "Natural Fillers-filled Styrene-Maleic Anhydride Copolymer Composites"—Wood Research—60(1):2015,167-174.

Sahibi Belkhiria, Thhierry Mieyer, Albert Renken "Styrene Maleic Anhydride Copolymerization in a Recycle Tubular Reactor; Reactor stability and Product Quality"—Chemical Engineering Science. vol. 49, No. 248, pp. 4981-4990. (1994).

Steffen Jockusch, Nicholas J. Turro, Yoshiro Mitsukami, Makoto Matsumoto—"Photoinduced Surface Crosslinking of Superabsorbent Polymer Particles"—J Appl Polym Sci 111: 2163-2170, (2009).

Hossein Hosseinzadeh "Synthesis and swelling properties of a poly(vinyl alcohol)-based superabsorbing hydrogel"—Current Chemistry Letters 2 (2013) 153-158.

Roman Geier, Christina Wappl, Hilde Freiszmuth, Christian Slugove and Georg Gescheidt "Thermal effects in polymerisations—a live view differentiating between bulk effects, thermal diffusion, and oxygen inhibition"—| Polym. Chem., 2015, 6, 2488-2492.

Z. Florjanczyk et al.(2000)"Lithium gel polyelectrolytes based on crosslinked maleic anhydride-styrene copolymer" Electrochimica Acta 45 (2000) 3563-3571.

Rakesh Singh et al (2013). "Biodegradation of Styrene-Butadiene-Styrene Copolymer via Sugars Attached to the Polymer Chain" Advances in Materials Physics and Chemistry, 2013, 3, 112-118.

* cited by examiner

Absorbency stability

POLYMERIC COMPOSITION FOR USE AS SOIL CONDITIONER WITH IMPROVED WATER ABSORBENCY DURING WATERING OF THE AGRICULTURAL CROPS

BACKGROUND OF THE INVENTION

Polymeric materials with high water absorbing capacity, or so-called superabsorbent polymers, SAP are known in the art. In recent years, water-absorbent polymers have been used not only for sanitary materials such as physiological napkins, paper diapers, and the like, but also for materials that require water-absorbent and water-holding properties, for use in farming and gardening. Unlike the other applicative domains in which the properties of SAPs are adapted to their intended use, in agriculture exists a poor correlation between the properties of SAPs used and the properties necessary to a polymeric soil conditioner. This poor correlation is revealed especially in water-holding capacity, water use efficiency consumption in units of kg SAP/ha and preservation of soil health that can participate again into a new cycle of crop production.

With the purpose to understand better the specific requirements of SAP that can be used as soil conditioner with high water holding capacity for agriculture, the principal functional characteristics of the soils-water-vegetable plants system are hereinbelow presented.

Soil-Water-Plants System

The soils are complex entities, that belong to solid porous materials. For the purpose of the present invention, the notion of "soil structure" will be described in terms of chemical composition and morphological structure of the soil.

Soil Chemical Composition

Soil is a mixture of mineral matter (40-50% by weight), air (25-45%), water (3-35% by weight), and organic matter (1-8% by weight). Chemical content of most important inorganic elements from soils (in dry state) are: oxygen (46.7%), siliceous (27%), aluminium (8.1%) and iron (5.0%). Plant nutrients like Ca, Mg, K, Na, P and S are present in the minerals and in the soil solution. Fe occurs mainly in the form of oxides and ferro-magnesium minerals. Ca occurs mainly in calcite, gypsum, apatite and dolomite. Mg is present mainly in dolomite and hornblend. K occurs mainly in microcline and mica. P occurs as aluminium phosphate and calcium phosphate and in the organic forn as phospholipids, inositol, choline, etc. N occurs mainly in the organic form as proteins, amino acids, etc. All micronutrients like Mo, Fe, Mn, Zn, Cu, B occur in the inorganic form.

Soil organic matter comprises all living soil organisms and all the residues of previous living organisms in their various degrees of decomposition. The living organisms can be animals, plants or micro-organisms, and can range in size from small animals to single cell bacteria only a few microns long. Non-living organic matter can be considered to exist in four distinct pools: a) Organic matter dissolved in soil water; b) Particulate organic matter ranging from recently added plant and animal debris to partially decomposed material and can constitute from a few percent up to 25% of the total organic matter in a soil; c) Humus which comprises both organic molecules of identifiable structure like proteins and cellulose, and molecules with no identifiable structure (humic and fulvic acids and humin) but which have reactive regions which allow the molecule to bond with other mineral and organic soil components. Humus usually represents the largest pool of soil organic matter, comprising over 50% of the total; d) Inert organic matter or charcoal derived from the burning of plants. [Tan K. H.2000]

Soil Morphological Structure

From the viewpoint of morphological structure, the soils represent polyphasic systems as solid-gas-liquid (SGL).

The solid phase is as particles. The size of particles and their dimensional distribution represent the soil texture. Because the organic phase is in low proportion, soil morphology is discussed usually only based on the mineral solid phase. The most important "native" mineral particles are: gravel with particle larger than 1 mm; sand with particles between 0.5 mm and 1 mm; silt between 0.002 mm and 0.5 mm and clay less than 0.002 mm. The amount of sand, silt and clay present in the soil determines the soil texture. In coarse textured soils: sand is predominant (sandy soils). In medium textured soils: silt is predominant (loamy soils). In fine textured soils: clay is predominant (clayey soils). Farmers often talk of light soil and heavy soil. A coarse-textured soil is light because it is easy to work, while a fine-textured soil is heavy because it is hard to work. The soil for agriculture contains solid particle in form of aggregates. Soil morphological structure also refers to the arrangement of these aggregates separated by pores and cracks. The basic types of aggregates arrangements are: granular, blocky, prismatic, and massive structure.

The gaseous phase is represented by air (eventually and $CO_2$ if its content is higher than the normal one from air). Air is distributed in the free space available resulted after the arrangement of solid phase under the form of a pre-established volume. The free space (volume), resulted from solid arrangement (in presence or absence of a compressing force) represents the porosity of the material entity that define the soil. The porosity of soils give some important properties: bulk density, water retention capacity, hydraulic conductivity and soil moisture tension (water retention curve).

The liquid phase, called also "soil water" represents an aqueous solution containing inorganic and organic combinations, that results after the interaction between a quantity of water administered (as one rainfall or one irrigation cycle) and soil.

Soil solution is the environment where the most important chemical reactions take place. The most important function of soil solution is its involvement in plant feeding, as it constitutes the main source of water and food elements for plants. The concentration of elements in soil solution is treated as the indicators for soil fertility. [Rutkowska B. et al. 2009]Soil solutions contain a wide range of anions, cations and uncharged compounds at various concentrations depending on soil acidity, organic matter content and land use.

In general, chloride, nitrate and sulfate are the most abundant inorganic anions. Calcium is the major cation in neutral arable soils, whereas soil solutions from acid forest soils are enriched in aluminium. Furthermore, organic solutes determined as dissolved organic carbon (DOC) can be present in high concentrations, particularly in organic matter-rich acid soils. In addition to largely unknown humic substances, the DOC includes anions of aliphatic mono-, di- and tricarboxylates and other low molecular mass organic compounds. These organic anions are considered to be important for mineral weathering and heavy metal mobilization in soils.[Westergaard B. 1998 ] Having in view the aim of the present inventions the indexes which characterize a soil solution are: pH and ionic strength (IS). The corresponding values of these two indexes are influenced by the chemical composition of soil and chemical composition of water used for watering of crops. In hypothesis that the watering is assured only by rainfall (with demineralized water), then the soil can give solutions with pH=3-10 (from acid soils to alkaline soils), with a total concentrations of ions (sum of anions and cations) in range from 0.002 mol $L^{-1}$ to 0.02 mol $L^{-1}$, that correspond to a range of ionic strength expressed versus NaCl as IS=0.002-0.02 Ms.

Water in soil is held in the pore spaces between particles of soil. Soil water is the water that is immediately available to plants. Soil water can be further sub-divided into three categories, 1) hygroscopic water, 2) capillary water, and 3) gravitational water.

Hygroscopic water is found as a microscopic film of water surrounding soil particles. This water is tightly bound to a soil particle by molecular attraction so powerful that it cannot be removed by natural forces. Hygroscopic water is bound to soil particles by adhesive forces that exceed 3,000 kPa and may be as great as 100,000 kPa.

Capillary water is held by cohesive forces between the films of hygroscopic water. The binding pressure for capillary water is much less than hygroscopic water (that exceeds 100 kPa and may be as 1000 kPa). This water can be removed by air drying or by plant absorption but cannot be removed by gravity. Plants extract this water through their roots until the soil capillary force (force holding water to the particle) is equal to the extractive force of the plant root. At this point the plant cannot pull water from the plant-rooting zone and it wilts (called the wilting point).

Gravity water is water moved through the soil by the force of gravity. The amount of water held in the soil after excess water has drained is called the field capacity of the soil. The amount of water in the soil is controlled by the soil texture. Soils dominated by clay-sized particles have more total pore space in a unit volume than soils dominated by sand. As a result, fine grained soils have higher field capacities than coarse-grained soils. [Waller R. M. 2006]

The correlations between soil texture and the variation of water content from soil under pressure action (suction) are presented in FIG. 1.

The soil moisture affects crop production. The plants require an adequate amount of soil moisture that may vary according to the crop species and stage of growth or development of a plant. The soil can only store a limited amount of water, and only a part of this storage is available to the plant. Without enough water, normal plant functions are disturbed, and the plant gradually wilts, stops growing, and dies. Plants are most susceptible to damage from water deficiency during the vegetative and reproductive stages of growth. Also, many plants are most sensitive to salinity during the germination and seedling growth stages.

Crop water use, also called evapotranspiration or ET, is an estimate of the amount of water transpired by the plants and the amount of evaporation from the soil su-face around the plants. The average consumption of water for most agronomic crops has value of 1-8 $L/M^2/day$, when the roots are situated at a depth of 10-30 cm, versus the top of the soil. A plant's water use changes with a predictable pattern from germination to maturity. All agronomic crops have a similar water use pattern (FIG. 2). However, crop water use can change from growing season to growing season due to changes in climatic variables (air temperature, amount of sunlight, humidity, wind) and soil differences between fields (root depth, soil water holding capacities, texture, structure, etc.). [Scherer, T. F. 1996; Kirnak H. et al. 2002; Valdés-Gómez H. et al 0.2009; Mata M. et al 1999]

Knowledge of water use patterns during the different growth stages has a major influence on how an irrigation system is designed and managed. Failure to recognize the water use patterns of a crop may result in poorly managed water applications. Crop water stress, fertilizer and pesticide leaching and increased pumping costs are just a few of the results of poor irrigation water management.

Super-Absorbent Polymers SAPs as Soil Conditioner

It is known in art to increase the readily available water capacity (RAWC) of soil by incorporating in soil water absorbing materials. These materials are generally polymers based in the form of powders, granules, microparticles, films or fibers. Upon contact with aqueous liquid systems, they swell by absorbing the liquid phase in their structure, without dissolving it. When the swelling reaches equilibrium there is obtaining a gel, which frequently is called "hydrogel". If the water absorbency is more than 100 g water/g dried polymer) the material is also called "superabsorbent" polymer (SAP).

Polymeric soil conditioners, were known since the 1950s (Hedrick and Mowry 1952). However, their wide commercial application failed even though the scientific basis for their use was quite well established. These polymers were developed to improve the physical properties of soil in view of:

increasing their water-holding capacity increasing water use efficiency enhancing soil permeability and infiltration rates reducing irrigation frequency reducing compaction tendency stopping erosion and water run-off increasing plant performance (especially in structure less soils in areas subject to drought).

Two distinct types of polymers have been studied and marketed for agricultural use. They are either soluble or insoluble in water.

The water-soluble polymers were the first ones to be developed, primarily to aggregate and stabilize soils, combat erosion and improve percolation. Examples include both homopolymers and copolymers such as poly(ethylene glycol), poly(vinyl alcohol), polyacrylates, polyacrylamide, poly(vinyl acetate-alt-maleic anhydride). These possess linear chain structures as shown below. A list of some other soil conditioners is given in an excellent review on the subject in [Azzam R. 1980].

Having in view the aim of the present invention the interest are the insoluble water-absorbing polymers.

The second class of polymers referred to as gel-forming polymers or insoluble water-absorbing polymers were first introduced for agricultural use in the early 1980's. These polymers do not possess linear chain structures as described previously but the chains are rather cross-linked to form a three-dimensional network.

In general, these materials have two principles of using:

in solid state, as particles (granules) with dimensions in the range of 0.2-4.0 mm, that are mixed with soil particles to form a wetting layer that is covered with a soil layer without SAP, and both layers together form the medium for plants cultivation;

in gel state, when the solid material is first subdued to swelling in water (which can contain or not different additives with stimulant effect), and the resulting gel is laid by hand around the roots of young plants (nursery, seedling etc) and in the end the plant with roots in gel is transplanted in soil.

Most of the studies with polymers were performed in the laboratory or greenhouse without consideration for the economics at the production level in large-scale agriculture. When the polymer is mixed into the soil at rates of about 0.1% by mass, it translates into amounts of 10 to 40 kg ha$^{-1}$. Such rates are obviously not economical for most uses. The need for more arable land in view of increasing agricultural production has renewed interest in the development of novel soil conditioner materials with new methods and lower rates of application.

For both polymeric variants, the water-holding capacity is the most important property when used in agriculture. This is a necessary condition but not the only necessary one. Other mandatory properties are: hydraulic conductivity (correlated with water soil capacity); absorbency under load (correlated with soil air permeability and compaction tendency of soil), absorbency in extreme climate (very hot or very cold), purity (correlate with safety of plants) and biodegradability (correlate with safety of soil).

Examples of polymeric materials that have high water holding capacity:

a) synthetic superabsorbent polymer SAP with three dimensional network, with principal skeleton chain that contain only carbons and which have secondary chains with polar chemical functions, either ionizable and/or nonionizable. The preparation methods of polymeric materials from this structural class are known in art and has the same concept of synthesis which consist in generating of three dimensional structure by cross-linked radical polymerization of a mixture of monomers that have only one vinyl group together with other monomers that have two or three vinyl groups. The representative synthesis processes can be found in art, as for example in U.S. Pat. Nos. 3,948,866; 3,966,902; 4,036,788; 4,163,092; 4,698,404; 5,013,349; 5,115,011; 5,312,661; 5,712,316; 5,720,736; 5,840,804; 5,866,678; 6,060,557; 6,326,446; 6,376,618; 6,660,819 and 6,710,141.

The water absorption performances of SAP polymers obtained by the methods exemplified above are in the range of 400-500 g water/g polymer for demineralized water and 30-50 g water/g polymer for saline solution that contain 0.9% NaCl.

Is interesting to remark that in agriculture applications, the chemical composition and resulting water holding properties of the water-absorbent material changes after each watering cycle due to the accumulation of salts from tap water and soil solution. In majority of cases, after 4-5 cycles of swelling-deswelling, the absorbency at the sixth cycle drops to about 35-45% from the absorbency value obtained on the first watering. (Akhter J. et al. 2004; Yangyuoru M et al 0.2006.; Ghebru M. G. et al. 2007; Ebrahimi S. et al. 2006; Green C. H. et al 2004). The presence of the phenomenon of decreasing of absorbency at increasing of the cycles of watering is confirmed also by EVONIK company for its products Stockosorb 500 and Stockosorb 660.

Diminishing of the absorbency value after each cycle of watering (rainfall or irrigation) is a direct outcome of gradually accumulation of electrolytes in the water-absorbent material (from water used for irrigation, or from the water of rainfall that dissolve a quantity of mineral substances existed in soil). The increasing of electrolytes concentration (in majority of cases are monovalent and polyvalent salts), is in conformity with the theory of equilibrium of Donnan membrane [Okay. et al. 1998; Homma. et al. 2000] and will cause a decrease in the water absorbency. The intensity of saline effect depends on the chemical structure of the water-absorbent material and the ionic character of salts.

The trials to diminishing the influence of salts on absorptive performances of SAP for agriculture are mentioned in the art e.g. in U.S. Pat. Nos. 4,340,706, 4,340,706, 6,342,652 and 6,410,616

Another aspect connected to performances of SAP products for use in agriculture is referred to Hydraulic Conductivity of Gels. The property is correlated with the capacity of hydrogel included in soil, after it attains the condition of Field Capacity (FC), to release water (after stopping of irrigation) to the soil by suction effect induced by the decreasing of water content owned of manifestation of evapotranspiration phenomenon.

The behavior of hydrogels resulted from SAP for agriculture from the viewpoint of hydraulic conductivity made the object of more studies, from which results that the material must be correlated with physical-chemical properties of soil and the water consumption of each plant crops, being significant differences between commercial products with near values for absorbency versus demineralized water. [Bhardwaj A. K. et al. 2007; Rowe E. C. 2005; Paluszek and Zembrowski 2008; Martyn and Szot 2001 Al-Darby A. M. 1996; Wahren A. 2009]

Referring to response of synthetic SAPs' at absorbency under load is found only a few information specific to conditions of functioning in soil [Bakass et al. 2002]. In general is accepted the hypothesis that a product has an absorbency under load (at a pressure of 0.9 psi) with values in range of 30-50 g/g versus saline solutions (0.9 5 NaCl) than the material will have a good functioning versus the situations that appear in agriculture.

In correlation with absorbency under load exist few information referring to swelling rate in conditions of soils with different structure and especially at intense aggregation which is occurred in arid climate, with high temperature [Raju and Raju 2001; Raju et al 2002]. In majority of cases the synthetic SAPs' satisfy the requests connected to swelling rate, but if the draining is fast, as in sandy soil or in soils with high aggregation, the rate of absorbency is proved to be insufficient, mainly when the particles have dimensions bigger than de 2 mm.

Another disadvantage of water absorbing material for agriculture based on polymers which their skeleton contain only atoms of carbon, is connected to the fact that these materials have a high degree of impurities with non-reacted monomer, of its content can be in the range 400-600 ppm. The synthesis processes known in art for purity increasing of SAP [i.e. U.S. Pat. No. 6,660,819] although are efficiently, by their application to agriculture product, give an excessive increasing of price, and will not be accepted by farmers.

Another disadvantage of water absorbing material for agriculture based on polymers which their skeleton contain only atoms of carbon, is given by the fact that they remain in soil a long period of time (5-7 years), what make them to be considered non biodegradable [Calmon-Decriaud et al 0.1998; Swift 2002].

Table 1 exemplifies a few types of SAP products used in agriculture and their performances.

TABLE 1

Commercial SAP, absorbency and consumption

| Name of Commercial Products | Producers | Polymer types | Absorbency, [g/g] Disfilterted water 0% NaCl | Tap water 0.1% NaCl | Salt water 0.9% NaCl | Consumption |
|---|---|---|---|---|---|---|
| Broadleaf | Agricultural Polymers International Ltd; AgriPol | anionic polyacrylamide | 400 | | 50 | n/a |
| Alcosorb | Ciba Specialty Chemicals | anionic polyacrylamide | 400 | 180 | | n/a |
| AQUASORB 3005 | SNF INC; Riceboro, Georgia | copolymer acrylamide and acrylate salts | 300 | 150 | | ;Broadcast on soil: 20 to 50 gram/m$^2$ |
| AQUASORB ® | P.O.L. Sorb/Manufactured By The ARK Enterprises, Inc. 107 S. Main Ionia, Missouri | sodium polyacrylate | 250 | | 42 | n/a |
| TRAMFLOC ® 1001 | TRAMFLOC, INC.; Tempe, AZ | copolymer of acrylamide and potassium acrylate | 380 | 190 | | 2-3 kg/m$^3$ in mixed to substrates consisting of sand, peat and compost; 50-100 g/m$^2$ in |
| Tramfloc ® 1009 | TRAMFLOC, INC.; Tempe, AZ | copolymer of acrylamide and potassium acrylate | 500 | 190 | | 2-3 kg/m$^3$ in mixed to substrates consisting of sand, peat and compost; 50-100 g/m$^2$ in |
| Luquasorb ® FP 800 | BASF SE, Ludwigshafen | sodium acrylate | 400 | 160 | | 50 g/m$^2$ |
| Stockosorb S; M; 400 RD | Evonik | copolymer of acrylamide/ acrylate, potassium, ammonium salt | | 250 | | 1.2 kg/cubic meter mix thoroughly into media or 290 g/m$^2$ tilled 6" deep |
| Stockosorb 660 | Evonik | polyacrylic acid - potassium salt | 250 | 100 | | n/a |
| Kaidi SAP | Zhejiang Kadi Pharmaceutical | sodium polyacrylate | 500 | | | n/a |
| HydroSeeds | Isragel Tech | sodium polyacrylate | 500 | 150 | 40 | 4-5 kg/cubic meter |
| Terra-Sorb | Plant Health Care | potassium acrylamide/ acrylate copolymer | | 200 | | 168 kg/ha |
| Water -Keep | Tree Farm Products | potassium based -polymer | 400 | 250 | | 19 g/m$^2$ tilled 2" deep or 24 g/m$^2$ tilled 6" deep |
| AquaGrain | Lohrmann International | potassium or sodium polyacrylate | 400 | 184 | 43 | n/a |
| HydroSorb | HydroSorb Inc | potassium based- polyacrylamide | 400 | | | 22.4-45 kg/ha tilled 4"- 8" deep |
| Soil Moist | JRM Chemical | polyacrylamide | | 200 | | 24-30 g/m$^2$ |
| Watersorb | Polymers Inc. | polyacrylamide copolymer | 400 | | | 22-24 g/m$^2$ tilled 2" deep or 24 g/m$^2$ tilled 6" |
| Water Crystals | Water Crystals | polyacrylamide copolymer | 400 | | | 0.8-1.6 kg/cubic meter |
| QemiSoyl | Qemi International | copolymer of acrylamide/ acrylate potassium salt | 500 | 200 | 40 | 10-15 kg/ha |
| Zeba | Absorbent Technologies Inc | starch polyacrylonitrile graft copolymer | 400 | 200 | | 9 kg/ha dropped in seed furrows below the seed |
| EcoSorb Water Saver | Eco Solutions | corn starch graft polymer | 400 | | | 9-11 kg/ha |

The water-holding capacity depends on the texture of the soil, the type of hydrogel and particle size (powder or granules), the salinity of the soil solution and the presence of ions.

b) SAP as synthetic polymer three dimensional network, with principal chain (skeleton) that contain besides carbon atoms and polar chemical groups as: ether, ester; amide or urethane and that have on secondary chains polar chemical functions, ionizable and/or non-ionizable. Three dimensional macromolecular configurations that in the presence of water give hydrogels, are included in category of biodegradable synthetic polymers [Jhurry 1997; Amass et al. 1998; Puoci et al. 2008]. From multiple variants of polymers enclosed in this category known in art, only a low number of macromolecular structures have been proposed for application in agriculture. In the first proposals have been the polyurethanic hydrogels, which are given in U.S. Pat. No. 4,241,537; 4,402,725; 4,469,502 and 5,791,085. These materials have a water holding capacity less than 200 g/g versus demineralized water and a low degree of purification what is the reason for a restraint uses on horticulture on small surfaces.

c) SAP as cross-linked biopolymers meant only to be used in agriculture are few referring in art. An example is described in U.S. Pat. No. 5,572,827 d) SAP as hybrid composite polymeric three dimensional network made from two or more polymers The most known in art are biodegradable SAP for agriculture, as starch graft copolymer, prepared by different graft processes and cross-linking copolymerization (U.S. Pat. Nos. 3,997,484; 4,116,899; 4,238,374; 4,483,950; 5,115, 011; 6,800,712; 7,009,020; 7,423,090; 7,423,106; 7,459, 501; WO/2009/014824

Another class of hybrid materials are biodegradable SAP for agriculture as composites of synthetic biodegradable polymer and polysaccharides cross-linked by irradiation (U.S. Pat. Nos. 3,993,553 and 4,058,124 and [Dafader et al. 2009]).

SAP materials that also contain protein materials are described in e.g. U.S. Pat. Nos. 5,847,089 and 6,310,105). Protein—polysaccharide composites are described in U.S. Pat. No. 6,821,331). Hybrid composite materials are described in U.S. Pat. No. 6,833,488; WO/2005/084724 and WO/2007/115169, and obtained by coupling poly(styrene-co-maleic anhydride) with gelatin. Such hybrid composite materials have absorbency of 250-350 g/g versus demineralized water and absorbency of 25-35 g/g versus saline solutions of 0.9% NaCl.

SUMMARY OF INVENTION

The present invention provides polymeric soil conditioner with high water absorbency capacity, and reduced effect of accumulation of salts in the hydrogel formed in soil conditioning applications.

The water absorbency of the polymeric soil conditioner remains stable during the watering cycles. It comes in the form of solid granular with dimension of particles of at least 0.2 mm, preferably between 0.2 to 0.8 mm or between 0.5 mm to 1.5 mm or between 1.0 mm to 3.0 mm.

The polymeric soil conditioner of this invention has a three-dimensional chemical structure obtained by crosslinking, whose crosslinking density is diminished after each cycle of swelling-deswelling. As a result, the accumulation effect of electrolytes inside the three-dimensional soil conditioner material, is reduced.

The present invention eliminates the disadvantages of soil conditioners known in art, by providing a new type of polymeric composition, with a chemical compositions and macromolecular configuration so designed to provide a high water absorbency stability and reduced salt accumulation.

It is a further object of the present invention to provide a novel type of high purity chemical polymeric material which ensures healthy vegetal food products.

It is a further object of the present invention to provide a new type of high purity chemical polymeric material which preserves the nutritional quality of soils since the material is completely biodegradable after 8-12 months after its use.

Another object of the present invention is to obtain a new type of polymeric material which, due to the presence in its composition of biopolymers that undergo biodegradation processes to form small molecules that can act as fertilizers and contribute to reducing the consumption of traditional fertilizers, and thereby reducing the costs necessary to achieve the agricultural production.

Another object of the present invention is to provide a new polymeric material as soil conditioner which can be used to combat the desertification by generating organic combinations and conferring biological activity to soils containing only sand and/or clay.

DETAILED DESCRIPTION OF INVENTION

Figure 1:
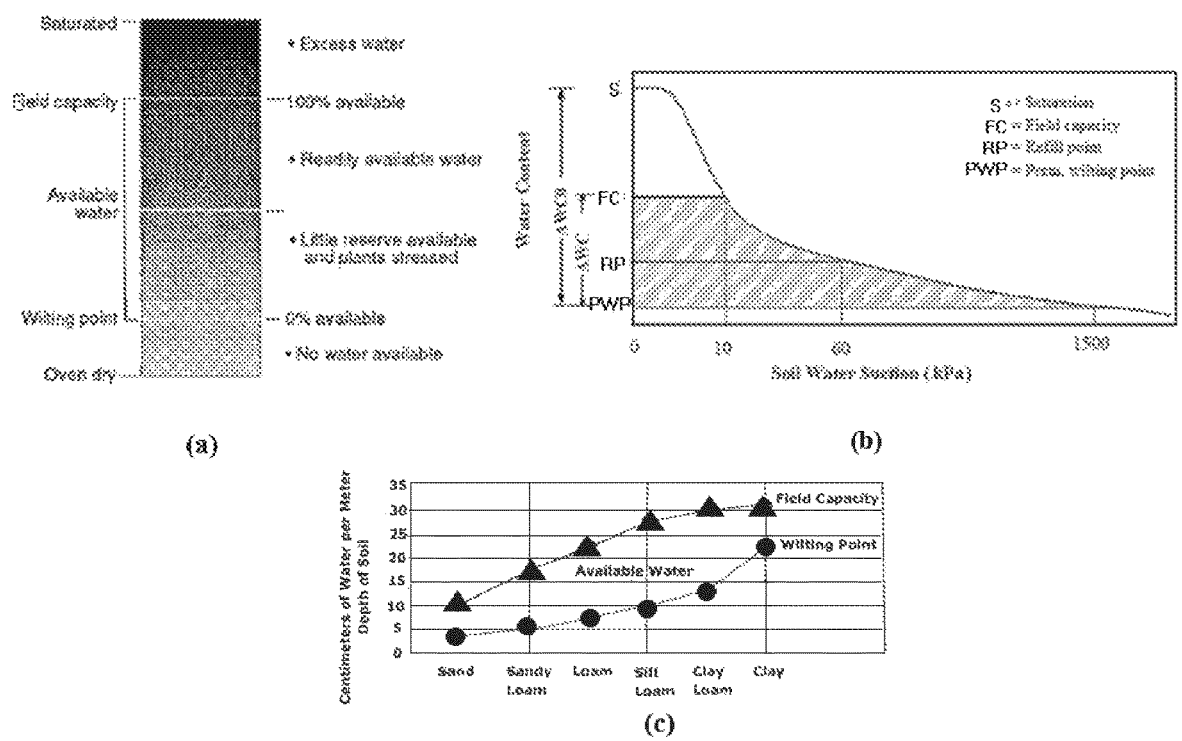
FIG. 1. The water content from soils (from Art) a) humidity content in function of soil's degree of drying; b) water available from soil for plants in function of soil water suction; c) influence of soils' structure on water content available for plants.
Figure 2:
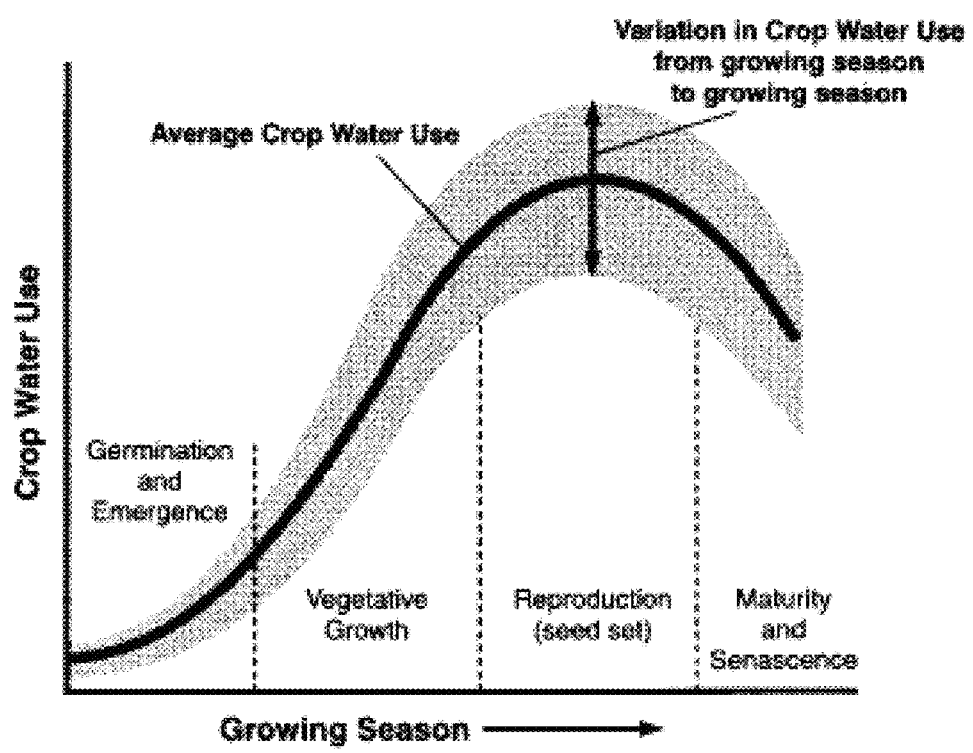
FIG. 2. Typical water use curve for most agronomic crops (from Art)
Figure 3:
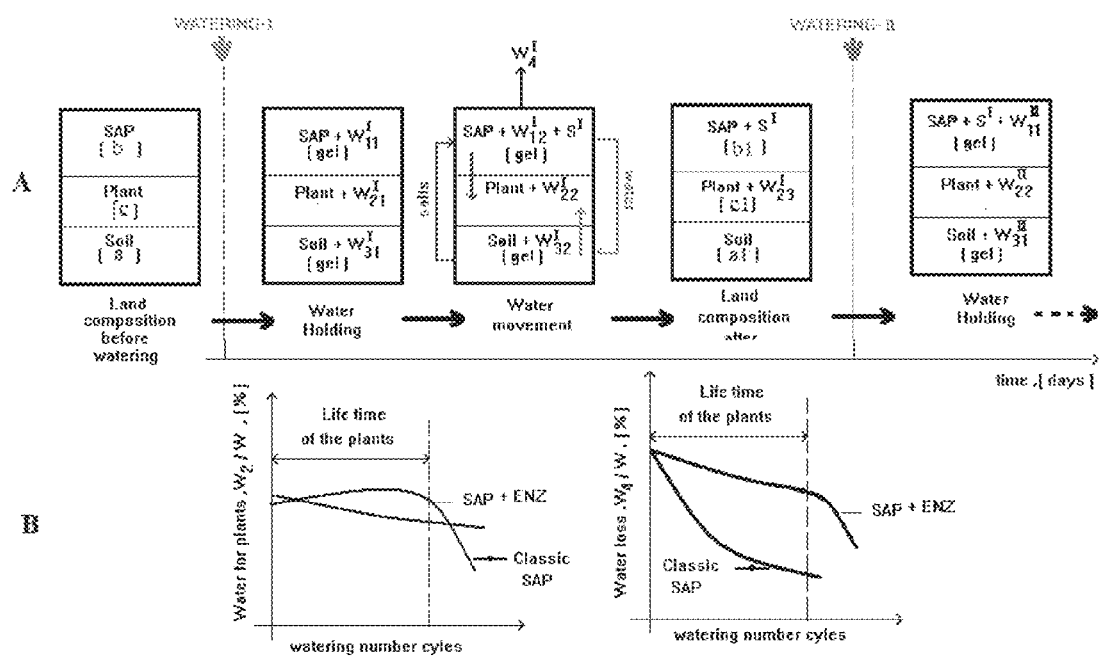
FIG. 3. General Model for the Interactions between: SAP, PLANT, SOIL and WATER; A—Water distribution into soil, SAP and plant, B—The positive effects of polymeric material that is the object of the present invention comparative with Classic soil conditioners; W—total water; W1—water in polymer; W2—water for plant; W3—water in soil; W4—water evaporated; S— salts FIG. 4. Simulation of influence of the cross-linking degree's variation of an ionic three dimensional network and of ionic strength of swelling media on absorbency of a material as SAP type. For calculations is used the relations (8)-(10) attributing to the other factors the following values: Flory polymer—solvent interaction parameter $\chi=0.495$; specific volume of polymer (volume/mass) $v_{sp,2}=0.7407$; molar volume of solvent (water, volume/mole) $v_{m,1}=18$; first dissociation constants of diprotic acid from monomer as maleic acid $K1=0.0114$; second dissociation constants of diprotic acid from monomer as maleic acid $K2=5.95E-08$; pH of swelling media, pH=8; weight fraction of ionizable polymer in the gel system $Ym=0.5$ FIG. 5. Rheological property of gel given by Oscillation Stress Sweep test FIG. 6. Comparatively influence of absorbency QTW in function of watering numbers for the product SCE-1 (with immobilized enzyme) and product SCC-1 (without immobilized enzyme)
Figure 4:
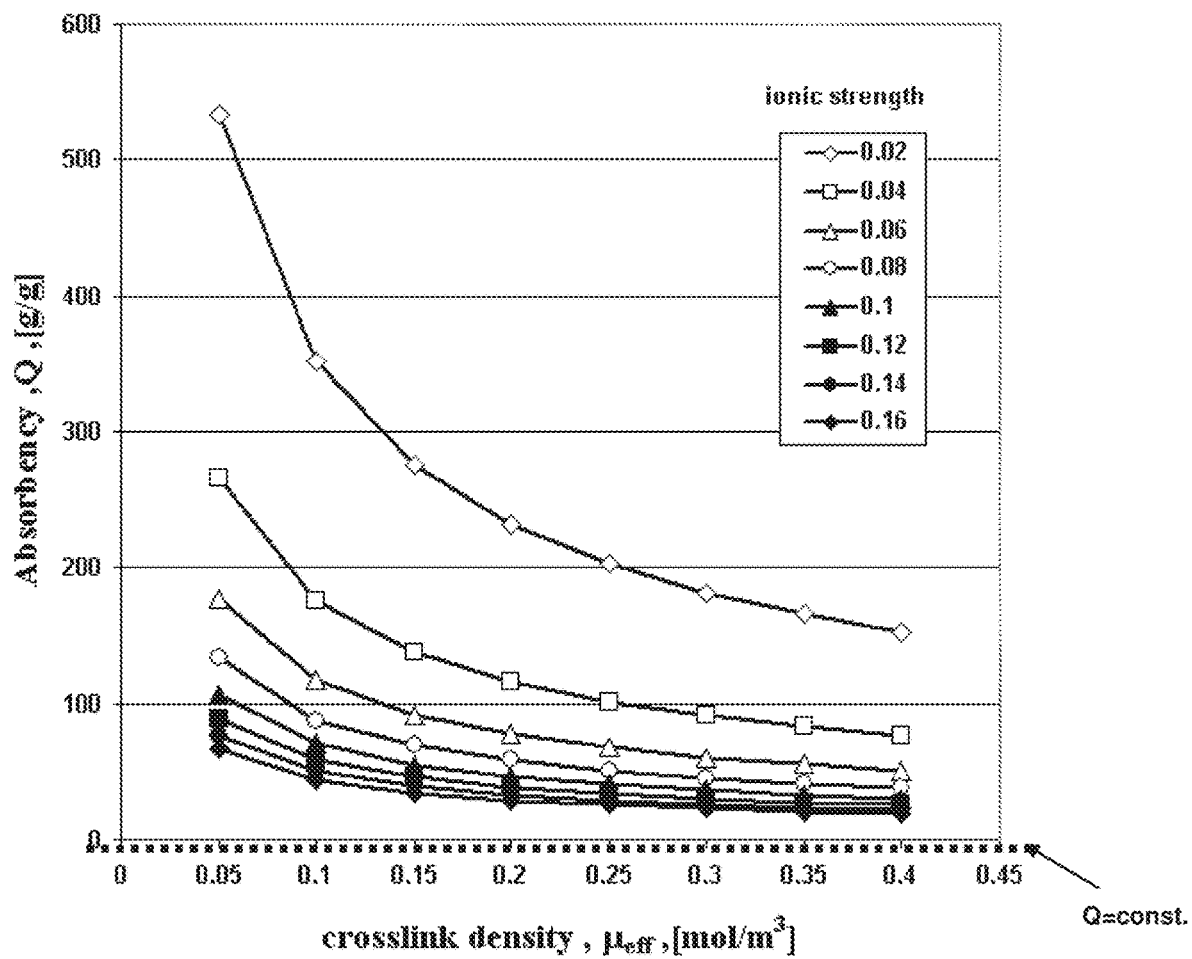

The present invention provides new polymeric soil conditioner, with high water absorbency and holding capacity- and reduced accumulation of salts during use in soil.

The polymeric soil conditioning composition of the invention satisfies the required criteria of functioning e.g. swelling and degradation. The composition is a macromolecular entity comprising two or three types of polymers A; B and C (including the case of only two polymers, A and B and an enzyme. The enzyme present in the polymeric soil conditioning composition causes destruction of the three dimensional configuration of the polymeric material, due to degradative processes in the swelling medium e.g. in the soil.

Preferred mixture ratios A:B:C are from 50:30:20 percent by dry weight of composition? to 95:4:1 percent by dry weight, preferable from 60:25:15 percent by weight to 90:6:4 percent by weight and most preferable from 70:20:10 percent by weight to 85:10:5 percent by weight Polymer A is a synthetic copolymer, with chemical backbone skeleton formed only from carbons. More preferably, A is a synthetic copolymer, that has free carboxylic groups. More preferably, the free carboxylic groups of polymer A can participate in degradation processes under adequate conditions of pH and temperature Synthetic copolymers used in the invention may be commercially available and obtained by known polymerization methods such as free radical polymerization optionally followed by chemical modification (known as "polymer—analogous transformations").

More preferred are binary copolymers, constituted by monomers M1 and M2, having the co-monomeric ratio M1:M2 with a value 50:50 by mol percent. Preferred copolymers are those in which M1 is a co-monomer with free chemical functions, which in contact with water confer to them an acid character. More preferred, in accordance with the invention's goal, are anhydrides, such as: maleic anhydride, itaconic anhydride, citraconic anhydride, 2-octenylsuccinic anhydride and respectively, that provide corresponding acids upon hydrolysis of the anhydride groups (maleic acid, itaconic acid etc.). Particularly preferably are: maleic anhydride and maleic acid. Referring to co-monomer M2, this is any type of monomer that from thermodynamic point of view, copolymerize with co-monomer M1. Preferred M2 monomers are from vinylic class of aliphatic derivatives, such as: mono-olefins e.g. ethylene, propene, butylene and isobutylene; alkyl vinyl ethers e.g. methyl vinyl ether, ethyl vinyl ether, propyl vinyl ether and butyl vinyl ether and alkyl vinyl esters e.g. vinyl formate; vinyl acetate, vinyl propionate and vinyl butyrate. Particularly preferably are isobutylene and methyl vinyl ether.

Examples of synthetic co-polymers of type A used in this invention are isobutylene-maleic anhydride copolymers and methyl vinyl ether-maleic anhydride copolymer with molecular weight higher than 50,000 Da, preferable with molecular weight higher than 100,000 Da.

Free carboxylic chemical functions of synthetic copolymer A, which done the object of this invention, are in partial dissociate state, corresponding to a neutralization degree comprised between 55-95%, preferable between 60-90% and, most preferable between 65-85%.

For partial neutralization of free carboxylic chemical functions of synthetic copolymer A, inorganic substance with intense basic character as hydroxides, bicarbonate or carbonate of potassium and ammonium, preferred being the hydroxides, were used.

Monovalent cations $K^{(+)}$ and $NH_4^{(+)}$, that are in composition of polymer A, which done the object of the present invention, confer to final product the quality of self—fertilizer, having an association ratio $K^{(+)}:NH_4(+)$ from 10:90 by weight to 90:10 by weight, preferable from 15:85 by weight to 85:15 by weight and more preferable from 20:80 by weight to 80:20 by weight, versus the value of neutralization degree adopted for carboxylic functions.

Synthetic SAP polymer is preferably in granular solid form with particles dimension of at least 0.2 mm, preferably in the range from 0.2 mm to 0.8 mm or from 0.5 mm to 1.5 mm or from 1.0 mm to 3.0 mm in correlation with using mode of the material in agriculture;

Polymer B within the soil composition represents protein biopolymers. More preferred are the protein biopolymers accepted by food industry and which are commercially available, such as: gelatin, albumin, casein or soybean protein. Particularly preferred is gelatin (food grade), obtained from resources such as: skin, bones, tendons, and other types of animal conjunctive tissues, having Bloom Index between about 20 and about 500, preferably between 100 and 300 bloom. Preferred isoelectric point (IP) of such proteins is between about 3.5 and about 9.5, preferably between about 4.5 to about 8.5.

The presence of protein biopolymers in the composition of the present invention, confers the quality of self fertilizer, and by this contribute to decreasing reduced consumption of traditional fertilizers, thus increasing the profit obtained from agricultural production. The quality and amount of self-fertilizer is controlled by the biodegradation process that occurs when the soil conditioning composition of the invention is in gel state Polymer C used in the conditioning composition of the invention is a polysaccharide biopolymer. Preferred polysaccharide biopolymers are from galactomannans class, consisting of a mannose backbone with galactose side groups (more specifically, a (1-4)-linked beta-D-mannopyranose backbone with branch points from their 6-positions linked to alpha-D-galactose, i.e. 1-6-linked alpha-D-galactopyranose). Preferred are: guar gum (mannose:galactose ~2:1), tara gum, (mannose:galactose ~3:1) and locust bean gum (mannose:galactose ~4:1). More preferred is guar gum for agriculture application known in art as hydro seeding, with a viscosity of solutions of 1% concentration in range of 500-3,000 cps, preferable with viscosity in range of 1,000-2,000 cps.

The polymeric soil conditioning composition of this invention is prepared as follows:

(i) purification of commercial synthetic polymer A: when in a standard mixer type equipped with stirrer as anchor type and a heating-cooling mantle, polymer A is loaded in solid state as powder. A quantity of demineralized water with a conductivity less than 10 S is added, to result a suspension of polymer with a concentration of solids between about 5% and about 35%, preferable between 15% and 25%. Aqueous suspension of polymer A, is stirred between 1 to 5 hours, preferably between 2 and 4 hours, at a temperature between 5° C. and 50° C., preferably between 10° C. and 40° C. In the end the aqueous dispersion is brought to room temperature, and the solid phase is separated by filtering under vacuum. The filtrate resulted is analyzed from the viewpoint of dissolved compounds content (represented by: non-reacted monomers, initiators or solvents used in polymer synthesis) using HPLC standard methods. In case when the concentration of sum of dissolved compounds is higher than 10 ppm, the purification operation described above is repeated for more times, until the content of compounds found in aqueous solution of supernatant has a concentration less than 10 ppm. After the last filtration is obtained a wet solid of polymer A, with a humidity content of 15-25% by weight;

preparation of the aqueous solution of carboxyl synthetic polymer A in salt form, when in an equipment of kneader type, with a heating-cooling mantle, is loaded the quantity of wet solid of synthetic polymer A that resulted after purification operation, a quantity of demineralized water, so in the final, to result a suspension of polymer with a concentration of 25-30% by weight, by stirring with a rotor speed not higher than 60 rpm, at room temperature, during a period of 0.5 hours. Further, at the homogenous aqueous suspension resulted is added the quantity of solution of ammonium hydroxide of 25-28% concentration, that correspond to the chemical composition and neutralization degree adopted for the final product. The alkaline suspension of polymer is mixed at room temperature a period of time of 2-8 hours, preferable 3-7 hours and more preferable 4-6 hours until it is obtaining a viscous solution, perfect transparent. At resulted solution is added a quantity of solution of potassium hydroxide of 50% concentration, that correspond to chemical composition and neutralization degree for final product and is mixed further for 30 minutes, at room temperature for system's homogenization. Is obtained a transparent solution of salt of synthetic polymer, with a concentration of solid of 25-30%, that has a viscosity higher than 70,000 cPs.

(ii) preparation of an aqueous solution of biopolymer B: in an equipment similar with that has been described above at the purification of synthetic polymer A, is loaded the quantity of biopolymer B in solid state, as powder and a quantity of demineralized water, so in the end, a suspension of polymer B is obtained, with a concentration of 15% by weight, by stirring with a rotor speed not higher than 60 rpm, during a period of 1 hour. Further, the mixture is heated under stirring at temperature of 40-80° C., preferable at 45-85° C., and most preferable at temperature of 50-90° C., after that the mixing regime and temperature is maintained to a constant value for a period of 30-180 minutes, preferable of 45-150 minutes, and most preferable of 60-120 minutes. In the end, the mixture resulted is cooled to temperature of 35-40° C., when is obtained a transparent solution of biopolymer B.

(iii) preparation of the aqueous solution of biopolymer C: in a blender equipment, biopolymer C is loaded in solid state, as powder and a quantity of demineralized water is added, to obtain a suspension of biopolymer C with a concentration of 1-5% by weight, preferable with a concentration of 2-4% by weight. Suspension transformation in solution is obtained by system mixing during 15-30 minutes at room temperature and at rotor speed of blender of 500-1000 rpm. Solution resulted is defoamed at vacuum.

(iv) preparation of the aqueous solution of polymer mixture composition (A:B:C): to a solution of synthetic polymer A as ammonium or potassium salt and pre-heated at temperature of 35-40° C., a solution of biopolymer B is added and the resulting viscous media is mixed during 30-60 minutes, at 35-40° C. temperature. Subsequently, to the solution of A and B, the solution of biopolymer C is added and the system is mixed further during 30-60 minutes at the same temperature. In the end, a transparent solution of polymers A, B and C is obtained, with a solid content of 15-20% by weight, and a viscosity higher than 100,000 cPs;

(v) the polymers viscous solution (A:B:C is cooled at room temperature, evacuated from kneader and profiled by an extruder that contain a holed plate from stainless steel with holes which has a diameter with a value not less than 2 mm and not higher than 10 mm, preferable between 4 mm and 8 mm, thus to obtain material pieces in cylindrical shape, with an element of cylinder not less than 5 mm and not higher than 25 mm, preferable between 10 mm and 15 mm. The cylindrical pieces of material are discharged on a metallic frame covered with a wire net from stainless steel, with holes of 100 microns. The frame with wire net that contain the material pieces is introduced in an oven with circulation of hot air to eliminate the water excess by evaporation. The material drying occurs in hot air current with temperature not less than 40° C. and not higher than 100° C., preferable between 50° C. and 90° C. The time of drying is adjusted so that at the end of the process to obtain a solid material with a humidity content of 5-10%.

(vi) the resulting dried material is grinded in equipment of cone mill type so to obtain a granular material with particles' dimensions in range of 0.3-3 mm correlated with the intended use e.g. in agriculture as soil conditioner.

(vii) the dried polymer composition (A:B:C) obtained in step (vi) above, is exposed to a thermal treatment, that promotes a crosslinking reaction between the A, B and C polymers from which the composition is consisted. Such crosslinking may also be termed de-hydrothermal crosslinking. In the current case the granular mass of ABC-dry composition obtained in step (vi) is loaded in a rotary vacuum dryer, in which the air has been pre-heated at temperature of 90-160° C., preferable at temperature of 100-150° C., and most preferable at temperature of 110-140° C. and mixed slowly with a rotation speed of 20-40 rpm during a period of 30-180 minutes, preferably 45-150 minutes, and most preferably 60-120 minutes. In the end, the granular mass is cooled to room temperature, after that is packed in polyethylene sacks under vacuum.

The soil conditioner obtained as per the above process has a three-dimensional chemical structure obtained through the thermal crosslinking described above. Upon use as soil conditioner, the crosslinking density of the initial product is diminished after each cycle of swelling-deswelling due to the enzymatic degradation of the protein ingredient in the conditioner. As a result, the accumulation effect of electrolytes inside the three-dimensional soil conditioner material, is reduced.

Generally, in known processes of plastics biodegradation, microorganisms attack nonwater-soluble polymer-based materials (plastics) [Muller, 2003]. This implies that the biodegradation of plastics is usually a heterogeneous process. Because of a lack of water-solubility and the size of the polymer molecules, microorganisms are unable to transport the polymeric material directly into the cells where most biochemical processes take place; rather, they must first excrete extracellular enzymes which depolymerize the polymers outside the cells. As a consequence, if the molar mass of the polymers can be sufficiently reduced to generate water-soluble intermediates, these can be transported into the microorganisms and fed into the appropriate metabolic pathway(s). As a result, the end-products of these metabolic processes include water, carbon dioxide and methane (in the case of anaerobic degradation), together with a new biomass.

As opposed to known plastic biodegradation processes, it is suggested that the biodegradation that takes place in the soil conditioner polymeric composition of the present invention, differs from known processes by the following aspects:
the enzyme present in the polymeric composition causes degradative processes due to the destruction of the three dimensional configuration of the polymeric material that is present in dissolved/hydrogel state in the swelling medium e.g. in the soil;
the intensity of the degradative processes varies with each? swelling-deswelling cycle underwent by the degrading polymeric composition;
the degradation rate is controlled and adapted per required application requests
the concentration of the degradation products increases inside of the hydrogel volume because of accumulation of the degradation products that occurs after each cycle of swelling-deswelling
material biodegradation is complete after 8-12 month Test Methods 1. Free Absorbency for Polymeric Materials
1.1. Swelling media types.
For characterization of polymeric material samples, which are the object of the present invention, their swelling was measured in a few types of media and the results are presented in Table 2.

TABLE 2

Swelling media types

| Swelling media | pH | Solid content [g/100 ml] | Conductivity [dS/m] |
|---|---|---|---|
| Demineralized water (DW) | 5.4 | 0 | 0.004 |
| Tap water (TW) | 6.7 | 0.59 | 0.71 |

TABLE 2-continued

Swelling media types

| Swelling media | pH | Solid content [g/100 ml] | Conductivity [dS/m] |
|---|---|---|---|
| Salt water, (SW) | 5.9 | 0.9 | 4.85 |
| Histosol soil solution, (HSS) Water:soil = 2:1 | 7.4 | 6.33 | 1.42 |
| Sterilized histosol soil solution (SHSS) Water:soil = 2:1 | 7.3 | 6.21 | 1.46 |
| Spodosol soil solution (SSS) Water:soil = 2:1 | 7.1 | 0.83 | 0.59 |
| Aridisol soil solution, (ASS) Water:soil = 2:1 | 6.8 | 0.62 | 0.87 |

For preparation of soil solution has been chosen three categories of soils having the characteristics presented in Table 3.

TABLE 3

Soil Types

| Soil characteristics | Soil-1 | Soil-2 | Soil-3 |
|---|---|---|---|
| Soil Type (USDA Soil Taxonomy) | Histosol soil | Spodosol soil | Aridisol soil |
| Usually name | "organic soil" "peat soil" | "Podzol soil" | "Sandy soil" |
| Field capacity, FC, % w/w | — | 23.4 | 15.8 |
| Permanent Wilting Point[1], PWP, % w/w | — | 12.5 | 6.3 |
| Refill Point[2], RP, % | — | 17.8 | 11 |
| Soil Organic Matter[3], SOM, % w/w | 63.7 | 4.12 | 0.87 |
| Moisture, % w/w | 49.8 | 7.3 | 3.6 |

[1], [2] have been evaluated with the apparatus Pressure Plate Extractor Model 1500 from Soilmoisture Equipment Corp., Santa Barbara CA., USA: PWP at 1500 kPa, and RP at 60 kPa;
[3] has been established by titration method (modified Walkley-Black procedure) [Brady 1990]

Soil solutions, representing aqueous extract of soil, has been prepared by mixing the available soil with distillate water at a ratio water:soil=2:1, stirring the system during 8 hours at room temperature, followed by filtration of the suspension under vacuum, using filter paper Whatman GF/A 40, and collecting the transparent liquid phase. The volume of 400-500 ml of soil solution resulted, has been characterized from properties viewpoint: pH and electrical conductivity, EC, using Laboratory Benchtop Meter Model 86505; pH/mV/ORP/Cond./TDS/SALT from MRC-Israel and respectively, the content in solid substance, using the gravimetric method. Swelling experiments has been done with dilute soil solution with a corresponding volume of distillate water so to obtain the same value for electrical conductivity, EC=0.71 dS/m, equal with EC for tap water, having in view the elimination of ionic strength effect on absorbency and in the same time to evidence the signification of the presence of the other components from soil solution on swelling.

Sterilized soil solution, is referred to aqueous extract obtained from organic soil, that has been dried first at 125° C. during 6 hours, for destruction of microorganism collection which are present in this type of soil [Dalev et al 2000]. In 300 ml of soil solution has been added 0.05 g sodium azide (NaN$_3$), preservative and enzymatic inhibitor.

1.2. Swelling tests
Has been done the following types of swelling tests:
swelling for 0.5 hour, as classic test for all types of SAP only for swelling media DW; TW and SW
swelling for 24 hours (1 day), in correlation with the time necessary for moisture equilibrium of soils after application of one watering cycle, that conduct to the corresponding value for field capacity, for tap water and soil solution
swelling for 2; 3; 4; 5; 6 and 7 days, in correlation with the time between two watering, and which has the goal to evidence the presence of biodegradation phenomenon of polymeric material in gel state, for tap water and soil solution.

The swelling test has been done thus:
In a beaker of 150 ml capacity are introduced a mass of sample of 0.2±0.0001 sample of SAP ($m_{dry}$). Then is added 100 ml swelling media. The beaker is covered with Parafilm foil and then is maintained at room temperature, without stirring, for swelling a pre-established time. After the end of swelling time, the content of beaker is added quantitatively in a Buchner funnel, covered with nylon filtering cloth, 100 microns (that has been weighted at technical balance), to drain the excess solution during 15 minutes. The quantity of gel resulted ($m_{wet}$) has been obtained as difference between the weight of funnel that contain the gel and the initial weight of it.

The free absorbency of polymeric sample has been calculated with the relation:

$$Q=(m_{wet}-m_{dry})/m_{dry}, [g/g]$$

Absorbency value for a swelling test represented the average of three replicates.

Absorbency corresponding to different tests of swelling has been symbolized with general expression "Qx-t", where:
x—is the symbol corresponding to swelling media: DW; TW; SW; HSS; SHSS; SSS and ASS,
t—is the symbol of swelling time: 1 h, for 1 hour, and respectively 1d; 2d; 3d; 4d; 5d; 6d and 7d for swelling processes of 1; 2; 3 . . . 6 and 7 days.

Examples of symbolizing for different absorbency are: QDW-1 h; QSW-1 h; QHSS-1d; QASS-5d etc.

2. Gel Rigidity of the Polymeric Gels
Value for gel rigidity GR, expressed in [Pa], of gels that resulted from swelling tests, is adopted as being equal with those corresponding to highest value of storage modulus $[G']_{max}$, from high elastic domain of the material that is tested with Oscillation Stress Sweep, in domain of stress tensions of 0.5-500 Pa.

The test has been realized with gels using Rheometer RheoStress 1 from ThermoHaake company (Germany) with a cylinder sensor Z20DIN and the program of stress Oscilation Stress Sweep.

Figure 5:
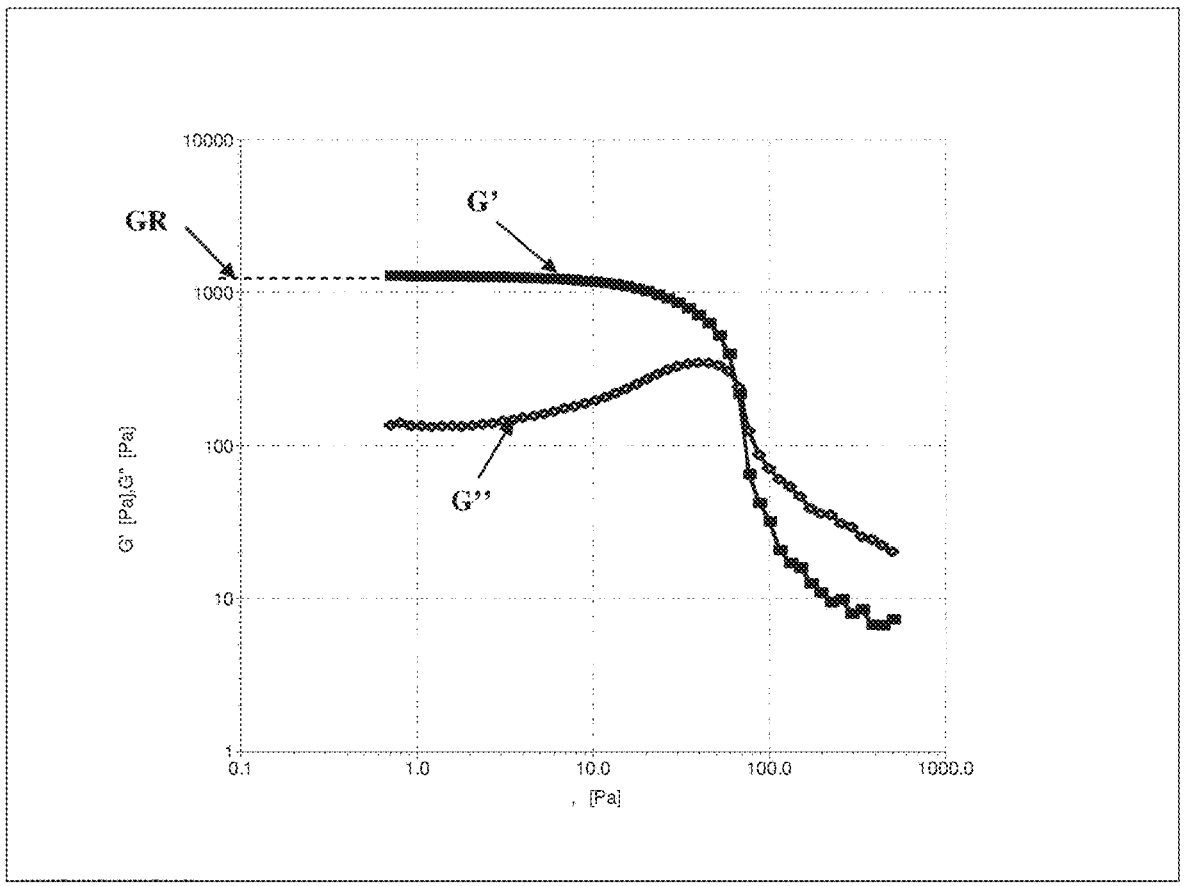

The test occurs as follows: in the fix cylinder of measurement of sensor has been added 8 grams of gel, and then it has been fit up at the measurement device of rheometer. Ulterior, it has been introduced the mobile cylindrical sensor in those fix and the system has been thermostated at the adopted testing temperature (25° C.) during 30 minutes. After thermostating, it is starting the test program. Experimental data have been processed with the software RheoWinPro—Data Manager of ThermoHaake. The graphical shape of a result of a test Oscillation Stress Sweep is given in FIG. 5.

3. Cross-Link Density of Polymeric Gels
Effective cross-linking density $\mu_{eff}$, of gels resulted after swelling of the polymeric material, that is the object of the present invention, has been achieved by calculation through the indexes-absorbency "Qx-t" and gel rigidity GR, that correspond to the swelling test from 1 to 7 days, using the relations [Muratore and Davis, 2000]:

$$\mu_{eff} = \frac{GR}{RT\phi_2^{1/3}}; [mol/m^3] \phi_2 = \frac{1}{Q[t]}$$

$$GR = [G']_{max}, kPa$$

$$T, °K$$

$$R = 8.31451, [Pa.m^3.K^{-1}.mol^{-1}]$$

4. Biodegradability

Relative biodegradability, RB-x, %, of polymeric material, that is the object of the present invention, has been defined by the ratio between effective cross-linking density of resulted gels after "x" days of swelling in soil solution and the effective cross-linking density of gels swelled only for 24 hours in tap water, expressed by relation:

$$RB - x = \frac{(\mu_{eff-xd})_{soilsol}}{(\mu_{eff-1d})_{TW}} * 100, [\%]$$

5. Absorbency During Liquid Flow

In a filter funnel from glass funnel for filtering of 100 ml capacity (interior diameter 52 mm and 73 mm height) with a filtering medium from synthware glass with a porosity 2 (pores with dimension between 40-100 μm-catalog Brand) and tare made at analytical balance, is weighted 0.3 g of polymer particles and are distributed uniform on filtering surface. Then is attached at the inferior part of the filter a rubber tube with Hoffman claim adjusted at a closing thus can be assure a drain of liquid with 10 ml per minute. In funnel are putted 100 ml of swelling media and is waited its drain. After, the liquid was drained is weighted the funnel with gel. The quantity of gel obtained was expressed as absorbency under flow $Q_F$, g/g.

6. Water Holding Capacity of Mixture Soil-Polymer in 10 Watering—Drying Cycles

The tests have been done only with Aridisol, and the experiments have been realized as follows:

1 kg of grinded soil, with maximum dimension of particles of 2 mm, (with known moisture $m_0$, % w/w, determinate by gravimetric method) is mixed with 3 g of polymeric material with maximum dimension of particles of 1.5 mm, that is the object of the present invention, in a laboratory planetary mixer (MRC Laboratory Equipment Manufacturer, Israel.) during 15 minutes. Triplicate of 150 g portions of soil mixture were filled in 400 cm³ plastic pots with a filter paper placed at the bottom with a small hole. Then, soil mixture was saturated with 200 ml tap water by placing in containers for 24 hrs. The pots were raised to drain out the excess water gravimetrically. After 24 hours has been determinate by gravimetric method the moisture of soil and polymer mixture, and the average value corresponding to those three replicates is noted with $FC_{p1}$, % w/w.

In parallel has been prepared (in the same conditions) triplicate pots that contain only soil, as control sample, when after watering and draining, the average soil moisture resulted is noted with $FC_{c1}$, % w/w.

Triplicate pots for samples and triplicate pots of control samples were placed under laboratory conditions at 25° C., for free drying until is attain the moisture content corresponding to refill point, RP±0.5, % w/w. The necessary time to attain the RP is noted as $(T_{RP})_{p1}$, expressed in days. Same has been done for control sample, resulting $(T_{RP})_{c1}$, % w/w.

Further, the samples have been subdued to a new cycle of watering and drying, resulting $FC_{p2}$ and $(T_{RP})_{p2}$, respectively $FC_{c2}$ and $(T_{RP})_{c2}$.

The methodology presented above has been repeated for more 8 cycles of watering-drying, resulting the series of values $FC_{p1}$-$FC_{p10}$, respective $(T_{RP})_{p1}$-$(T_{RP})_{p10}$. For control sample has been obtained the series of values $FC_{c1}$-$FC_{c10}$, respective $(T_{RP})_{c1}$-$(T_{RP})_{c10}$.

All the numerical values recorded represent the average of three replicates.

The sum of values corresponding to series $(T_{RP})_{p1}$-$(T_{RP})_{p10}$ and $(T_{RP})_{c1}$-$(T_{RP})_{c10}$ is called "Crop Life Time", CLT, expressed in days, that represents practically for how many days of normal development of crop the water administrated is enough in a pre-established number of watering (watering number, WN), and have been calculated with relation:

$$CLT = \sum_{i=1}^{WN} (T_{RP-i}), days$$

For the present description of invention has been used the value corresponding after 7 watering, $AS_{W7}$, as indicator for performance of polymeric materials with different chemical structure.

EXAMPLES

The following examples are intended only to further illustrate the invention and are not intended to limit the scope of the invention, which is defined by the claims.

Example 1

In a reaction vessel of 1 Liter, equipped with a stirring rod of anchor type with four blades, thermostatic jacket and thermometer are introduced 600 ml demineralized water with a conductivity of 4.3 S and 150 g of ISOBAM 18, poly(isobutylene-co-maleic anhydride) with a molecular mass of 350,000 Da, from Kuraray Co. Ltd, Japan as synthetic polymer A. Aqueous suspension of polymer A, is stirring 4 hours at temperature of 40° C. In the end the aqueous dispersion is brought to ambient temperature, and the solid phase is separated by filtration at vacuum. The wet solid is washing three times with 100 ml demineralized water each time. The supernatant is analyzed from the viewpoint of content of dissolved substances using HPLC. The wet solid is subdued to another extraction in similar conditions described above. After 3 extractions, content of dissolved substances in supernatant has been of 8 ppm. Finally, are obtained 192 g of wet solid, with a humidity content of 22.9% by weight.

Further, in an laboratory equipment as kneader type (Batch Mixer Model LNG 0.25 from AARON Process Equipments, Bensenville, IL, USA) with a working volume of 1200 ml, with a heating-cooling mantle, are introduced 192 grams of purified synthetic polymer A and is mixed with 121 grams of solution of ammonium hydroxide of 28% concentration (ACROSS catalog no. 20584-0025). The alkaline suspension of polymer is mixed at ambient temperature during 6 hours. At the resulted solution is added 27 grams of potassium hydroxide solution of 50% concentration prepared from pellets (ACROSS catalog no. 42414-0025) and is continue the mixing for 30 minutes at room temperature for system homogenization. Are obtained 340 grams of transparent solution of salt of ammonium and potassium with a solid concentration of 57.29% of synthetic polymer A and which has a neutralization degree of 76.92% in relation to the content of carboxylic functions.

While preparing the synthetic polymer solution, the solutions of gelatin and trypsin are prepared. Thus, a) in a beaker of 250 ml with a magnetic stirrer is preparing 150 grams solution of gelatin by dissolving 25 g of gelatin solid type A, 175 Bloom, from swine (Aldrich, catalog no. 27,161-6), in 125 ml of demineralized water with a conductivity of 4.3 µS with temperature of 50° C.

b) in a beaker of 250 ml with a magnetic stirrer is preparing 100 grams solution of trypsin by dissolving 15 grams of trypsin sold (Sigma-Aldrich, catalog no. T1426) in 85 ml of demineralized water with a conductivity of 4.3 µS at temperature of 25° C. After 60 minutes is obtaining a solution of enzyme of 15% concentration.

Next, over the solution of synthetic polymer in the form of salt of ammonium and potassium existing in Kneader, preheated at temperature of 60° C., is added the gelatin solution and is mixed the system for 60 minutes at the mentioned temperature.

Then, the solution of polymer mixture composition (A:B) is profiled by an extruder (Kitchen Aid Mixer manufactured by the Hobart Manufacturing Company, USA) that contain a holed plate from stainless steel with holes which has a diameter of 6 mm, thus to obtain material pieces in cylindrical shape, with a height of cylinder of 15 mm. The material is discharged on a metallic frame covered with a wire net from stainless steel, with holes of 100 microns.

The frame with wire net that contain the material pieces is introduced in an oven with circulation of hot air to eliminate the water excess by evaporation. The material drying occurs in hot air current with temperature of 80° C. for 6 hours. Are obtained 258 grams of dry polymeric composition (A:B), with a humidity content of 12.79% by weight.

Next, the polymeric composition of (A:B) wands are crushed in the laboratory cone mill, when a granular mass is produced with particle sizes in the range of 0.5-1.5 mm.

Further the granular mass is loaded in a powder flask of 1000 ml which is mounted to a laboratory rotary evaporator after that the flask is immersed in an oil bath with silicon pre-heated at 110° C. In regime of rotation with 50 rpm and under the vacuum of 150 mbar, the granular mass is maintained at mentioned temperature during 90 minutes, when occurs the crosslinking of the polymeric composite (A:B) and its transformation into water absorbing material, as soil conditioner, which is the object of this invention. The crosslinked polymer material is cooled at ambient temperature, in mixing regime at atmospheric pressure. Are obtained 237.34 grams of intermediary product as superabsorbent constituted from composite (A-B) with a humidity content of 5.2%.

From the polymeric composite (A-B) thermic crosslinked, 118 grams are called Soil Conditioner Control (SCC-1) respective polymeric that does not contain the immobilized enzyme.

Further over 119 grams from the rest of composite (A-B) crosslinked existent in the powder flask is sprayed 8 ml enzyme solution of 15% concentration when occurs the immobilization of enzyme on the mass of superabsorbent (A-B) by absorption and ionic complexation, immobilization process is continue during 2 hours at temperature of 25° C. It resulted 127 grams of granular mass with dry look with a humidity content of 9.81%. The obtained material was called Soil Conditioner with Enzyme (SCE-1).

Finally, the SAP mass with immobilized enzyme is packed in polyethylene bags sealed under vacuum.

The polymer material corresponding to example 1, as soil conditioner, which is the object of the present invention, was further subjected to tests for the evaluation of its properties.

Absorbency properties of polymeric material SCE-1 are shown in table 4.

TABLE 4

Absorbency properties of sample SCE1

| Swelling media | Qx-0.5 h [g/g] | Qx-1 d [g/g] | GRx-1 d [kPa] | $\mu_{eff} \times 10^3$ [mol/m³] | $Q_F$ [g/g] |
|---|---|---|---|---|---|
| DW | 426 | 512 | 0.590 | 1.45 | 247 |
| TW | 204 | 263 | 0.643 | 1.48 | 108 |
| SW | 88 | 123 | 0.728 | 1.46 | 46 |
| HSS | 172 | 206 | 0.59 | 1.39 | 101 |
| SSS | 168 | 197 | 0.602 | 1.41 | 97 |
| ASS | 171 | 190 | 0.612 | 1.42 | 98 |

Degradation by trypsin of the three-dimensional network of polymeric material consisting from ISOBAM crosslinked with gelatin has been highlighted using an experiment in which the product SCE-1 that turned into a hydrogel after its treating with tap water with absorbency $Q_{TW}$-1d of 263 g/g is maintained in this phase for another 6 days at the 25° C. and with the sample protected against water loss by evaporation when everyday has been measured GR-TW [kPa] and then has been evaluated by calculation $\mu_{eff}$[mol/m³] and finally has been calculated the value for relative biodegradability RB [%]

The alteration of the three-dimensional structure of the gels corresponding to the polymer material SCE-1 is sustained by the data from table 5.

TABLE 5

Properties of gel (SCE-1) during swelling time

| Time [days] | $GR_{DW}$ [kPa] | $\mu_{eff}$ [mol/m³] | RB [%] |
|---|---|---|---|
| 1 | 0.590 | 1.39 | 6.08 |
| 2 | 0.548 | 1.33 | 10.01 |
| 3 | 0.505 | 1.27 | 14.18 |
| 4 | 0.473 | 1.21 | 18.24 |
| 5 | 0.427 | 1.12 | 24.32 |
| 6 | 0.378 | 0.97 | 34.45 |
| 7 | 0.308 | 0.76 | 48.64 |

From the experimental data presented in Table 5 it is noted that the SE-1 product after 7 days suffers an alteration of the three-dimensional structure of the crosslinked polymeric material in proportion of 48.6% which demonstrates the existence of the biodegradation process of the SAP with enzyme immobilized when the material is in the form of hydrogel.

The absorbency improvement of a SAP material with the immobilized enzyme versus a soil conditioner without enzyme during several drying-watering cycles has been shown by using the samples of SCE-1 and SCC-1.

For this purpose, at the beginning the two samples were used to obtain $Q_{-TW}$-1d (0.2 grams+150 ml TW). After 3 days each sample has been dried at 30° C. in the current of air using a laboratory oven, until each has a moisture content of 15% (which simulates the permanently wilting point PWP). Further, the dry samples were treated with 150 ml TW, and $Q_{-TW}$-1d was measured. After 3 days each sample was dry and have been performed the operations mentioned after the first watering. The experimental methodology mentioned for the first two watering has been repeated over the course of another 8 watering. The results obtained are presented in FIG. 6.

Figure 6:
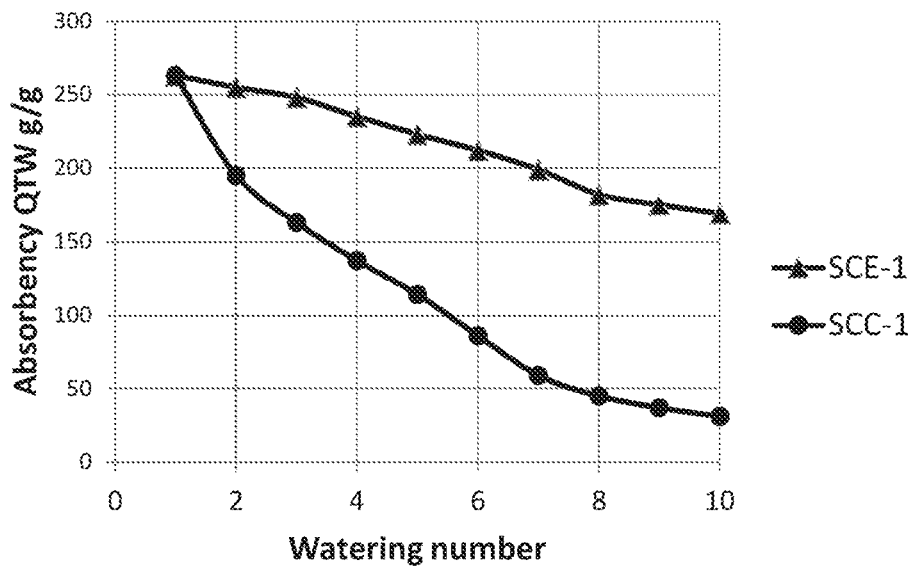

The experimental data in FIG. 6 shows the product SCE-1, that is the object of this invention, after 10 cycles of drying-watering with tap water and it still has an absorbency that represents 64.25% from the absorbency value after the first watering. The SCC-1 sample that has no immobilized enzyme has an absorbency value which represents only 11.78% from the absorbency value after the first watering. Soil solutions resulted as aqueous extract from non-organic soils (Spodosoil SSS, and Aridisoil, ASS), in contact with polymeric material SCE-1, causes only the continue increasing of absorbency, during the seven days of testing, which can be seen from the data presented in table 6. Supplementary, these data show the significance of soil type on efficacy of using of the polymeric materials as soil conditioner.

TABLE 6

Influence of the soil type on absorbency and relative biodegradation of polymeric material SCE-1

| Time | Soil solution SSS | | Soil solution ASS | |
|---|---|---|---|---|
| [days] | $Q_{SSS}$, [g/g] | RB, [%] | $Q_{ASS}$, [g/g] | BR, [%] |
| 1 | 197 | 4.73 | 190 | 4.05 |
| 2 | 200 | 5.41 | 190 | 4.72 |
| 3 | 207 | 6.08 | 191 | 5.11 |
| 4 | 216 | 6.75 | 193 | 5.87 |
| 5 | 225 | 7.43 | 196 | 6.23 |
| 6 | 234 | 10.13 | 203 | 7.55 |
| 7 | 242 | 15.54 | 211 | 8.78 |

Example 2

The same method of preparation and the same equipment as in Example 1 with the difference that: at the homogenous aqueous suspension of synthetic polymer A is added 84 grams of solution of ammonium hydroxide concentration 28%, and at the resulted solution after 6 hours is added 58 grams of potassium hydroxide solution of concentration 50%. Is obtained 634 grams of transparent solution of ammonium and potassium salt of synthetic polymer A, which has a degree of neutralization of 64.91% in relation to the content of carboxylic functions content, with a solid concentration of 31.5% and which has a viscosity of 106,000 CP. Finally, 184 grams of polymeric material called SCE-2, with a moisture content of 5.8%, are obtained.

Example 3

The same method of preparation and the same equipment as in Example 1 with the difference that is used ISOBAM-10, with molecular mass of 160,000 Da, and the cross-linking of polymeric composition (A:B:C) occurs at 130° C. during 45 minutes. In the end are obtained 198 grams of polymeric material called SC-3, with dimensions of particles in the range of 0.5-1.5 mm, and a moisture content of 4.7%

Example 4

The same method of preparation and the same equipment as in Example 1 with the difference that over the solution of synthetic polymer A in salt form of ammonium and potassium existed in kneader, pre-heated at temperature of 40° C., is added first 115 grams of gelatin solution as biopolymer B, by dissolving of 15 g of gelatin type A, 100 Bloom, from swine (Aldrich, catalog no. 27,161-6) in 100 ml of demineralized water with a conductivity of 4.3 μS with temperature of 50° C. and the system is mixed during 60 minutes, at temperature of 40° C. Ulterior, over solution that contains the polymers A and B, from kneader are added 450 grams of guar solution of 4% concentration by weight and is mixed continue the system for another 60 minutes at the same temperature. Is obtained a transparent solution, with a solid content of 16.3% by weight, and a viscosity of 109,000 cPs. After thermal cross-linking are obtained 203 grams of polymeric material called SC-4, with a moisture content of 6.1% Representative properties of polymeric materials as soil conditioner SC-2; SC-3 and SC-4, that is the object of the present invention, are presented in table 7.

TABLE 7

Properties of samples SCE-2; SCE-3 and SCE-4

| Properties | SCE-2 | SCE-3 | SCE-4 |
|---|---|---|---|
| $Q_{SSS}$-1 d, [g/g] | 178 | 195 | 181 |
| $GR_{SSS}$-1 d, [kPa] | 0.695 | 0.523 | 0.712 |
| $\mu_{eff}$ [mol/m$^3$] | 1.57 | 1.22 | 1.62 |
| $Q_F$, [g/g] | 91 | 108 | 85 |
| [RB-7]$_{SSS}$, [%] | 16.12 | 12.45 | 18.51 |
| $CLT_{Spodosol}$, [days] | 102 | 96 | 98 |
| [AS$_{10}$]$_{Spodosol}$, [%] | 58.5 | 67.3 | 61.8 |

Example 5

In a reaction vessel of 1 Liter, equipped with a stirring rod of anchor type with four blades, thermostatic jacket and thermometer are added 600 ml demineralized water with a conductivity of 4.3 S and 50 grams GANTREZ AN139, poly(vinyl methyl ether-co-maleic anhydride) with a molecular mass of 1,000,000 Da, from ISP as synthetic polymer A.

The aqueous suspension of polymer A is stirred for 4 hours at temperature of 40° C. In the end the aqueous dispersion is brought to ambient temperature, and the solid phase is separated by vacuum filtration. The wet solid is washed 3 times with 100 ml demineralized water. The supernatant is analyzed from the viewpoint of dissolved substances content using HPLC. The wet solid is subdued to another extractions in similar conditions described above. After 3 extractions, the content of dissolved substances in the supernatant was 8 ppm. Finally, 192 g of wet solid with a moisture content of 22.9% by weight is obtained.

Further, in an laboratory equipment as kneader type (Batch Mixer Model LNG 0.25 from AARON Process Equipments, Bensenville, IL, USA) with a working volume of 1200 ml, with a heating-cooling mantle, are introduced 192 grams of purified synthetic polymer A which is mixing with 121 grams of solution of ammonium hydroxide of concentration 28% (ACROSS catalog no. 20584-0025). The alkaline suspension of polymer is mixed at ambient temperature for 6 hours. At the resulted solution is added 27 grams of hydroxide potassium solution of concentration 50% (ACROSS catalog no. 42414-0025) and continue the mixing for 30 minutes at room temperature for homogenizing the system. Is obtained 340 grams of transparent solution of salt of ammonium and potassium of synthetic polymer A with a solid concentration of 57.29% and which has a degree of neutralization of 71.06% in relation to the content of carboxylic functions.

While preparing the synthetic polymer solution, the solutions of gelatin and trypsin are prepared also. Thus, a) in a beaker of 250 ml, in which there is a magnetic stirrer is preparing 150 grams solution of gelatin by dissolving 25 g of gelatin solid type A, 175 Bloom, from Swine (Aldrich, Catalog No. 27, 161-6), in 125 ml of demineralized water with a conductivity of 4 3 µS with the temperature of 50° C.;

b) in a beaker of 250 ml, in which is a magnetic stirrer is prepared 100 grams trypsin solution by dissolving 15 grams of trypsin (Sigma-Aldrich, catalog no. T1426) in 85 ml of demineralized water with a conductivity of 4.3 µS at 25° C. temperature. After 60 minutes is obtained a 15% concentration enzyme solution.

Then, the solution of polymer mixture composition (A:B) is profiled by an extruder (Kitchen Aid Mixer manufactured by the Hobart Manufacturing Company, USA) that contain a holed plate from stainless steel with holes which has a diameter of 6 mm, thus to obtain material pieces in cylindrical shape, with a height of cylinder of 15 mm. The material is discharged on a metallic frame covered with a wire net from stainless steel, with holes of 100 microns.

The frame with wire net that contains the material pieces is introduced in an oven with circulation of hot air to eliminate the water excess by evaporation. The material's drying occurs in hot air current with temperature of 80° C. for 6 hours. Are obtained 258 grams of dry polymeric composition (A:B), with a humidity content of 12.79% by weight.

Next, the polymeric composition of (A:B) wands are crushed in the laboratory cone mill, when a granular mass is produced with particle sizes in the range of 0.5-1.5 mm.

Further the granular mass is then loaded into a 1000 ml powder flask which is fitted to a laboratory rotary evaporator after which, the flask is immersed in a bath with pre-heated silicone oil at 110° C. In rotation regime with 50 rpm and under the action of a vacuum of 150 mbar, the granular mass is maintained at the temperature mentioned for 90 minutes, when the polymer composition (A:B) is crosslinked and occurs its transformation into water absorbing material, as soil conditioner, which is the object of this invention. The crosslinked polymer material is cooled at ambient temperature, in mixing regime at atmospheric pressure. 237.34 grams of intermediate product as superabsorbent are obtained from composite (A-B) with a moisture content of 5.2%. Further, over 119 grams of (A-B) crosslinked material existed in the flask powder is sprayed 8 ml of 15% concentration of enzyme solution when immobilization of enzyme occurs on the superabsorbent (A-B) mass by absorption and ionic complexation, the immobilization process is continue for 2 hours at temperature of 25° C. Is resulted 127 grams of dry-looking granular mass with a moisture content of 9.81%. The obtained material was called Soil conditioner with Enzyme (SCE-5). Finally, the mass of SAP with the enzyme immobilized is packed in polyethylene bags sealed under vacuum.

TABLE 8

Properties of sample SC-5 and HydroSeeds

| Swelling media | SC-5 | HydroSeeds |
|---|---|---|
| $Q_{TW}$-0.5 h, [g/g] | 216 | 148 |
| $Q_{TW}$-1 d, [g/g] | 258 | 174 |

TABLE 8-continued

Properties of sample SC-5 and HydroSeeds

| Swelling media | SC-5 | HydroSeeds |
|---|---|---|
| $Q_{ASS}$-1 d, [g/g] | 193 | 138 |
| $GR_{ASS}$-1 d, [kPa] | 0.652 | 1.326 |
| $\mu_{eff}$ [mol/m$^3$] | 1.52 | 2.76 |
| $Q_F$, [g/g] | 112 | 49 |
| [RB-7]$_{HSS}$, [%] | 78.6 | 0 |
| [RB-7]$_{ASS}$, [%] | 39.3 | 0 |
| $CLT_{Aridisol}$, [days] | 103 | 75 |
| [AS$_{10}$]$_{Aridisol}$, [%] | 63.2 | 37.8 |

The experimental data contained in table 8 shows that the commercial HydroSeed product, which belongs to the class of polyacrylate SAP, shows absorptive properties inferior to the polymeric materials that are the object to the present invention. Also, in swollen state, the product represents a much more rigid gel than the SC-5, and the crosslinked density of the three-dimensional network is superior. In the same context, it is noted that the commercial product is not biodegradable, the characteristics of the gels remain the same during 7 days of interaction with soil solution obtained from organic soil.

Figure 7:
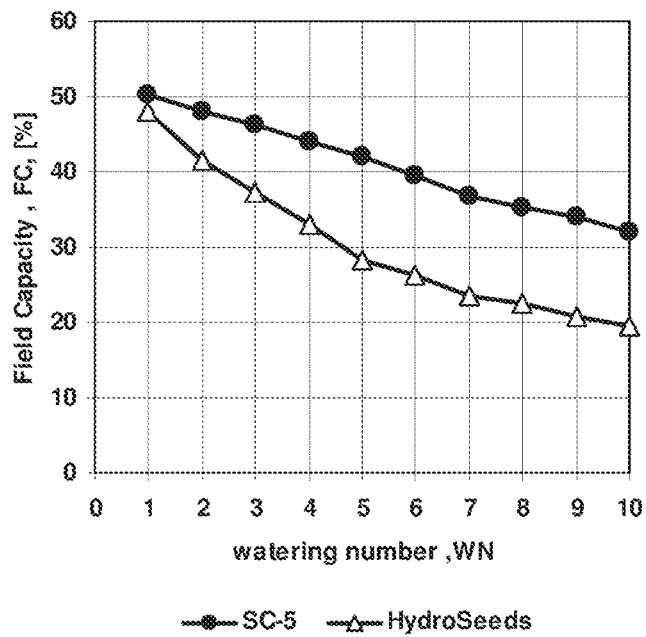
FIG. 7. Absorbency stability (Field Capacity, FC, %) of mixtures of Aridisol with SC-5 and of mixtures of Aridisol with HydroSeeds, during 10 cycles of wetting-drying.
Figure 8:
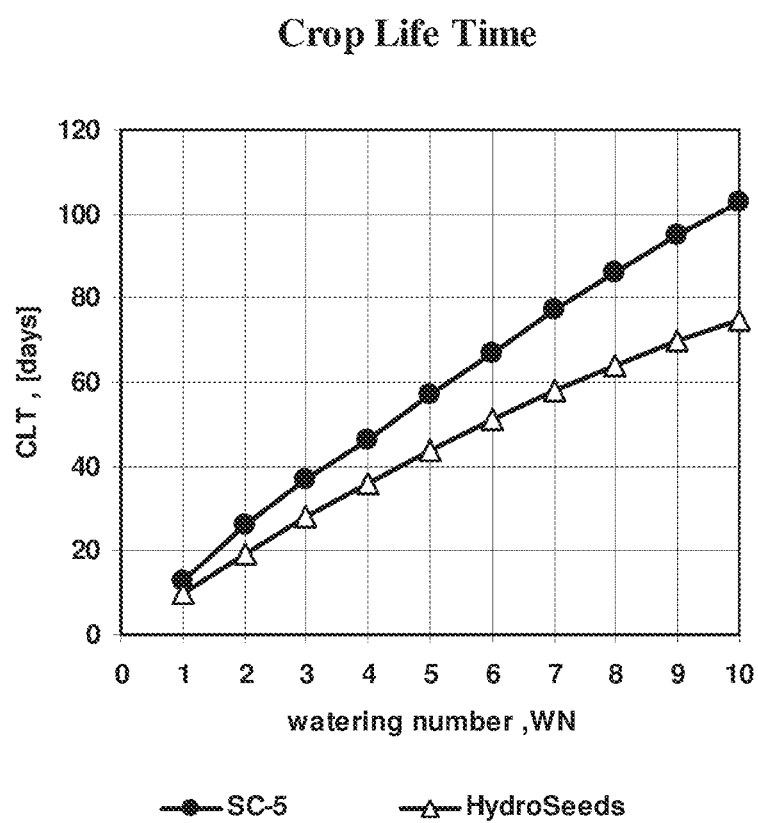
FIG. 8. Cumulative re-fill time (Crop Life Time of mixtures of Aridisol with SC-5 and of mixtures of Aridisol with HydroSeeds, during 10 cycles of wetting-drying.

Water holding capacity of mixture soil-polymer in 10 watering—drying cycles and absorbency stability of polymeric material SC-5 and HydroSeeds are presented in FIG. 7 and FIG. 8.

There is a remarkable difference between the commercial product and the polymeric material that is the object of this invention, caused by reduced stability in the accumulation of electrolytes during the 10 watering applied ($AS_{10}$=37.8% compared to 63.2% for SC-5) and which is reflecting on the life time of agricultural culture (HydroSeed ensure CLT=75 days of development, while SC-5 allows normal development at CLT=103 days). Basically, the SC-5 polymer material allows a significant reduction in water consumption for an agricultural culture being much more effective than the tested commercial product.

While the invention has been described in connection with a preferred embodiment, it is not intended to limit the scope of the invention to the particular form set forth, but on the contrary, it is intended to cover such alternatives, modifications, and equivalents as may be included within the spirit and scope of the inventions as disclosed and claimed herein.

References
U.S. Patent Documents

| | | |
|---|---|---|
| 3,948,866 | Pennewiss, et al. | Apr. 6, 1976 |
| 3,966,902 | Chromecek | Jun. 29, 1976 |
| 3,993,553 | Assarsson, et al. | Nov. 23, 1976 |
| 3,997,484 | Weaver, et al. | Dec. 14, 1976 |
| 4,036,788 | Steckler | Jul. 19, 1977 |
| 4,058,124 | Yen, et al. | Nov. 15, 1977 |
| 4,116,899 | Fanta, et al. | Sep. 26, 1978 |
| 4,163,092 | Steckler | Jul. 31, 1979 |
| 4,238,374 | Durham, et al. | Dec. 9, 1980 |
| 4,241,537 | Wood | Dec. 30, 1980 |
| 4,340,706 | Obayashi, et al. | Jul. 20, 1982 |
| 4,402,725 | Heller, et al. | Sep. 6, 1983 |
| 4,469,502 | Heller, et al. | Sep. 4, 1984 |
| 4,483,950 | Fanta, et al. | Nov. 20, 1984 |
| 4,698,404 | Cramm, et al. | Oct. 6, 1987 |
| 4,703,108 | Silver, et al. | Oct. 27, 1987 |
| 4,971,954 | Brodsky, et al. | Nov. 20, 1990 |
| 5,013,349 | Tanaka | May 7, 1991 |
| 5,115,011 | Harada, et al. | May 19, 1992 |

-continued

References
U.S. Patent Documents

| | | |
|---|---|---|
| 5,312,661 | Suzuki, et al. | May 17, 1994 |
| 5,340,853 | Chmelir, et al. | Aug. 23, 1994 |
| 5,382,270 | Graham, et al. | Jan. 17, 1995 |
| 5,413,747 | Akers, et al. | May 9, 1995 |
| 5,525,682 | Nagatomo, et al. | Jun. 11, 1996 |
| 5,572,827 | Conrad | Nov. 12, 1996 |
| 5,712,316 | Dahmen, et al. | Jan. 27, 1998 |
| 5,720,736 | Hatsuda, et al. | Feb. 24, 1998 |
| 5,733,576 | Chmelir | Mar. 31, 1998 |
| 5,791,085 | Szmidt, et al. | Aug. 11, 1998 |
| 5,840,804 | Carl, et al. | Nov. 24, 1998 |
| 5,847,089 | Damodaran, et al. | Dec. 8, 1998 |
| 5,866,678 | Kajikawa, et al. | Feb. 2, 1999 |
| 5,986,042 | Irizato, et al. | Nov. 16, 1999 |
| 5,998,491 | Haar, Jr. | Dec. 7, 1999 |
| 5,998,492 | Haar, Jr., et al. | Dec. 7, 1999 |
| 6,060,557 | Dahmen, et al. | May 9, 2000 |
| 6,066,325 | Wallace, et al. | May 23, 2000 |
| 6,309,454 | Friedman, et al. | Oct. 30, 2001 |
| 6,310,105 | Damodaran | Oct. 30, 2001 |
| 6,326,446 | Carter | Dec. 4, 2001 |
| 6,342,652 | Harada, et al. | Jan. 29, 2002 |
| 6,376,618 | Mitchell, et al. | Apr. 23, 2002 |
| 6,410,616 | Harada, et al. | Jun. 25, 2002 |
| 6,630,422 | Sannino, et al. | Oct. 7, 2003 |
| 6,660,819 | Chmelir, et al. | Dec. 9, 2003 |
| 6,710,141 | Heide, et al. | Mar. 23, 2004 |
| 6,800,712 | Doane, et al. | Oct. 5, 2004 |
| 6,821,331 | Damodaran | Nov. 23, 2004 |
| 6,833,488 | Bucevschi, et al. | Dec. 21, 2004 |
| 7,009,020 | Doane, et al. | Mar. 7, 2006 |
| 7,071,327 | Mensitieri, et al. | Jul. 4, 2006 |
| 7,163,563 | Schwartz, et al. | Jan. 16, 2007 |
| 7,423,090 | Doane, et al. | Sep. 9, 2008 |
| 7,423,106 | Doane, et al. | Sep. 9, 2008 |
| 7,459,501 | Doane, et al. | Dec. 2, 2008 |
| WO/2005/084724 | Bucevschi, et al. | Sep. 15, 2005 |
| WO/2007/115169 | Bucevschi, et al. | Oct. 11, 2007 |
| WO/2009/014824 | Savich et al. | Jan. 29, 2009 |

OTHER REFERENCES

Akhter J., Mahmood K., Malik K. A., Mardan A, Ahmad M., Iqbal M. M, [2004] Effects of hydrogel amendment on water storage of sandy loam and loam soils and seedling growth of barley, wheat and chickpea *Plant Soil Environ.* Vol. 50: 463-469

Al-Darby A. M [1996] The hydraulic properties of a sandy soil treated with gel-forming soil conditioner *Soil Technology* Vo. 9:15-28

Amass W., Amass A., Tighe B. [1998] "A Review of Biodegradable Polymers: Uses, Current Developments in the Synthesis and Characterization of Biodegradable Polyesters, Blends of Biodegradable Polymers and Recent Advances in Biodegradation Studies" *Polymer International* Vol. 47:89-144

Azzam R. [1980]. Agricultural polymers. Polyacrylamide preparation, application and prospects in soil conditioning. *Communications in Soil Science and Plant Analysis* Vol. 11: 767-834

Bakass M., Mokhlisse A., Lallemant M. [2002 "Absorption and Desorption of Liquid Water by a Superabsorbent Polymer: Effect of Polymer in the Drying of the Soil and the Quality of Certain Plants" *J Appl Polym Sci Vol.* 83: 234-243

Baker S. W. [1991]. The effect of polyacrylamide copolymer on the performance of Lolium perenne L. turf grown a sand rootzone. *Journal of Sports Turf Research Institute* Vol. 67: 66-82.

Bhardwaj A. K., Shainberg I., Goldstein D., Warrington D. N., Levy G. J. [2007] Water Retention and Hydraulic Conductivity of Cross-Linked Polyacrylamides in Sandy Soils *Soil Sci. Soc. Am. J. Vol.* 71:406-412

Blyth E.[2002] "Modelling soil moisture for a grassland and a woodland site in south-east England" *Hydrology and Earth System Sciences,* Vol. 6: 39-47

Brady, N.C. [1990]. The nature and properties of soils. 10th edition. 621 pp. Macmillan Publishing Co., New York, NY.

Bryant S. J., Anseth K. S. [2002] "Hydrogel properties influence ECM production by chondrocytes photoencapsulated in poly(ethylene glycol) hydrogels" *J Biomed Mater Res* Vol. 59: 63-72, Bucholz F. L., Graham A. T. [1998] *"Modern Superabsorbent Polymer Technology",* John Wiley & Sons Inc.

Calmon-Decriaud A., Bellon-Maurel V., Silvestre F. [1998] "Standard Methods for Testing the Aerobic Biodegradation of Polymeric Materials. Review and Perspectives" *Advances in Polymer Science* Vol. 135:207-226

Caykara T., Ozyurek C., Kantoglu O., Guven O. [2000] "Characterization of Network Structure of Poly(N-vinyl 2-pyrrolidone/acrylic acid) Polyelectrolyte Hydrogels by Swelling Measurements" *Journal of Polymer Science: Part B: Polymer Physics,* Vol. 38: 3309-3317

Ebrahimi S., Homaee M., Ebrahimi B. [2006] Cyclic Swelling Behavior of Superabsorbent Polymers in Soil Porous Media; 18*th World Congress of Soil Science,* p 9-15, Philadelphia, Pennsylvania, USA El Hady O. A., Tayel M. Y., Lofty A. A. [1981]. Super gel as a soil conditioner. II. Its effects on plant growth, enzyme activity, water use efficiency and nutrient uptake. *Acta Horticulturae* Vol. 19: 257-265.

Flannery R. L., Busscher W. J. [1982]. "Use of a synthetic polymer in potting soils to improve water holding capacity" *Communications in Soil Science and Plant Analysis* Vol. 13: 103-111

Ghebru M. G., duToit E. S., Steyn J. M. [2007] "Water and nutrient retention by Aquasoil and Stockosorb polymers" *University of Pretoria, Department of Plant Production and Soil Science*

Green C. H., Foster C., Cardon G. E., Butterl G. L., Brick M., Ogg B. [2004] "Water Release from Cross-linked Polyacrylamide" *Hydrology Days*

Gualtieri G. M., Gobran R. H., Nien Yu-Hsun, Kalidindi S. R. [2001] "Swelling of Crosslinked Poly(Methylmethacrylate-Acrylic Acid) Copolymers in Serum and Saline Solutions" *Journal of Applied Polymer Science* Vol. 79: 1653-1664

Hedrick R. M. and Mowry D.T.[1952] "Effect of synthetic polyelectrolytes on aggregation, aeration and water relationships of soil." in *Soil Science* (1952), Vol. 73: 427-441

Homma M., Seida Y., Nakano Y. [2000] "Evaluation of Optimum Condition for Designing High-Performance Electro-Driven Polymer Hydrogel Systems" *Journal of Applied Polymer Science* Vol. 75: 111-118

James E. A., Richards D. [1986] "The influence of iron source on the water holding properties of potting media amended with water-absorbing polymers". *Scientia Horticulturae* Vol. 28: 201-208.

Jhurry D. [1997]"Agricultural Polymers" *AMAS. Food and Agricultural Research Council,* Réduit, Mauritius Johnson M. S. [1984a]. "The effects of gel-forming polyacrylamides on moisture storage in sandy soils". *J. Sci. Food Agric.* Vol. 35: 1063-1066.

Kiatkamjornwong S., Phunchareon P. [1999] "Influence of Reaction Parameters on Water Absorption of Neutralized Poly(acrylic acid-co-acrylamide) Synthesized by Inverse Suspension Polymerization" *J Appl Polym Sci* Vol. 72: 1349-1366

Kirnak H., Short T. H., Hansen R. C. [2002] "Studies on the relationships among moisture tension, microclimate and transpiration rate of container grown *Acer rubrum*" *J. Appl. Hort.* Vol. 4(2):65-69

Lanthong P., Nuisin R., Kiatkamjornwong S. [2006] "Graft copolymerization, characterization, and degradation of cassava starch-g-acrylamide/itaconic acid superabsorbents" *Carbohydrate Polymers* Vol. 66: 229-245

Lee Wen-Fu, Wu Ren-Jey [1996] "Superabsorbent Polymeric Materials. 1. Swelling Behaviors of Crosslinked Poly(sodium acrylate-co-hydroxyethyl methacrylate) in Aqueous Salt Solution" *Journal of Applied Polymer Science*, Vol. 62: 1099-1114

Lu D. R., Xiao C. M. Xu S. J. [2009] "Starch-based completely biodegradable polymer materials" *eXPRESS Polymer Letters* Vol. 3:366-375

Martyn W., Szot P. [2001] "Influence of superabsorbents on the physical properties of horticultural substrates" *Int. Agrophysics* Vol. 15, 87-94

Mata M., Girona J., Goldharner D., Fereres E., Cohen M., Johnson S. [1999] "Water relations of lysimeter-grown peach trees are sensitive to deficit irrigation" *California Agriculture* Vol. 53:17-20

Milimouk I., Hecht A. M., Beysens D., Geissler E. [2001] "Swelling of neutralized polyelectrolyte gels" *Polymer* Vol. 42: 487-494

Okay O., Sariisik S. B., Zor S. D. [1998] "Swelling Behavior of Anionic Acrylamide-Based Hydrogels in Aqueous Salt Solutions: Comparison of Experiment with Theory" *Journal of Applied Polymer Science* Vol. 70: 567-575

Okazaki Y., Ishizuki K., Kawauchi S., Satoh M., Komiyama J [1996]. "Ion-Specific Swelling and Deswelling Behaviors of Ampholytic Polymer Gels" *Macromolecules* Vol 29: 8391-8397

Omidian H., Hashemi S. A., Sammes P. G., Meldrum I. [1999] "Modified acrylic-based superabsorbent polymers (dependence on particle size and salinity)" *Polymer* Vol. 40: 1753-1761

Ozyurek C., Caykara T., Kantoglu O., Guven O. [2000] "Equilibrium Swelling Behavior of pH- and Temperature-Sensitive Poly(N-vinyl 2-pyrrolidone-g-citric acid) Polyelectrolyte Hydrogels" *Journal of Polymer Science: Part B: Polymer Physics*, Vol. 38: 2063-2071

Pill W. G., Jacono C. C. [1984]. "Effects of hydrogel incorporation in peat-lite on tomato growth and water relations". *Communications in Soil Science and Plant Analysis* Vol. 15: 799-810.

Pourjavadi A., Amini-Fazl M. S., Hosseinzadeh H. [2005] "Partially Hydrolyzed Crosslinked Alginate-graft-Polymethacrylamide as a Novel Biopolymer-Based Superabsorbent Hydrogel Having pH-Responsive Properties" *Macromolecular Research* Vol. 13: 45-53

Pourjavadi A., Harzandi A. M., Hosseinzadeh H. [2005a] "Modified Carrageenan. 6. Crosslinked Graft Copolymer of Methacrylic Acid and kappa-Carrageenan as a Novel Superabsorbent Hydrogel with Low Salt- and High pH-Sensitivity" *Macromolecular Research*, Vol. 13:483-490

Puoci F., Iemma F., Spizzirri U. G., Cirillo G., Curcio M., Picci N. [2008] "Polymer in Agriculture: a Review" *Am. J. Agri. Biol. Sci., Vol.* 3: 299-314

Raju K. M., Raju M. P., Mohan Y. M. [2002] "Synthesis and Water Absorbency of Crosslinked Superabsorbent Polymers" *J Appl Polym Sci* Vol. 85: 1795-1801

Raju M. P., Raju K. M. [2001] "Design and Synthesis of Superabsorbent Polymers" *J Appl Polym Sci* Vol. 80: 2635-2639

Rutkowska B., Szulc W., Labetowicz J. [2009] "Influence of Soil Fertilization on Concentration of Microelements in Soil solution of Sandy Soil"; *J. Elementol., Vol.* 14:349-355

Sadeghi M., Hosseinzadeh H. [2008] "Synthesis and Swelling Behavior of Starch-Poly (Sodium Acrylate-co-Acrylamide) Superabsorbent Hydrogel" *Turk J Chem* Vol. 32: 375-388.

Sannino A. [2008] "Application of Superabsorbent Hydrogels for The Optimization of Water Resources in Agriculture" *The 3rd International Conference on Water Resources and Arid Environments and the 1st Arab Water Forum*

Scherer T. F., Seelig B., Franzen D. [1996] "Soil, Water and Plant Characteristics Important to Irrigation North Dakota Irrigation Guide; *County Soil Survey Reports*; EB-66; NRCS Publications Sohn O., Kim D. [2003] "Theoretical and Experimental Investigation of the Swelling Behavior of Sodium Polyacrylate Superabsorbent Particles" *J Appl Polym Sci* Vol. 87: 252-257

Tan K. H. [2000] *"Environmental Soil Science"* Second Edition, Marcel Dekker. Inc. New York Valdés-Gómez H., Ortega-Farias S., Argote M. [2009] "Evaluation of Water Requirements for a Greenhouse Tomato Crop Using the Priesley-Taylor Method" *Chilean J. Agric Res.* Vol. 69:1-11

Wahren A., Feger K.-H, Schwarzel K., Munch A. [2009] "Land-use effects on flood generation—considering soil hydraulic measurements in modeling" *Adv. Geosci.* Vol. 21: 99-107

Waller, R. M. [2006] *"Ground Water and the Rural Homeowner"*. USGS Wang W., Kang Y., Wang A. [2010] "Synthesis, characterization and swelling properties of guar gum-g-poly(sodium acrylate-co-styrene)/muscovite superabsorbent composites" *Sci. Technol. Adv. Mater.* Vol. 11

Wang Y. T., Greg L. L. [1989]. "Hydrophilic polymers-their response to soil amendments and effect on properties of a soilless potting mix". *J. Amer. Soc. Hort. Sci. Vol.* 115: 943-948.

Westergaard B., Hansen H. C. B., Borggaard O. K [1998], *Analyst. Vol.* 123:721-724

Xiao C. M., Tan J., Xue G. N. [2010] "Synthesis and properties of starch-g-poly(maleic anhydride-co-vinyl acetate)" *eXPRESS Polymer Letters* Vol. 4: 9-16

Yangyuoru M., Boateng E., Adiku S. G., KAcquah D. [2006] "Effects of Natural and Synthetic Soil Conditioners on Soil Moisture Retention and Maize Yield" *West Africa Journal of Applied Ecology* (WAJAE), Vol. 9: 1-8

Zohuriaan-Mehr M. J., Kabiri K. [2008] "Superabsorbent Polymer Materials: A Review" *Iranian Polymer Journal* Vol. 17: 451-477

We claim:

1. A polymeric soil conditioner for use in conjunction with soil irrigation, comprising a superabsorbent polymer (SAP) mixture and a protein degrading enzyme, said SAP mixture comprising polymer A, which is a synthetic copolymer having a chemical skeleton consisting of carbon atoms and containing free carboxyl groups, and polymer B, which is a protein biopolymer, and optionally polymer C, which is a polysaccharide, wherein polymer A and polymer B, and if present, polymer C, are thermally crosslinked to generate a three-dimensional chemical structure and said protein degrading enzyme facilitates degradation of said SAP mixture.

2. The polymeric soil conditioner according to claim 1, wherein said SAP mixture comprises a mixture of three polymers A, B and C, with a mixture ratio A:B:C from 85:13:2 percent by dry weight of SAP to 95:4.5:0.5 percent by dry weight.

3. The polymeric soil conditioner of claim 2, wherein the mixture ratio from is 86:13:1 percent by dry weight to 92:6.5:1.5 percent by dry weight.

4. The polymeric soil conditioner according to claim 1, wherein said SAP mixture is in the form of solid granular particles with diameter in the range from 0.2 mm to 3.0 mm.

5. The polymeric soil conditioner according to claim 1, wherein the synthetic polymer A is a copolymer made of two types of monomers M1 and M2, having the co-monomeric ratio M1:M2 of 50:50 by mol percent and a neutralization degree between 45-80%, wherein:
M1 is a co-monomer having free anhydride chemical groups; and
M2 is any monomer capable to copolymerize with monomer M1.

6. The polymeric soil conditioner according to claim 1, wherein said synthetic copolymer A is in cationic form, with cations being $K^{(+)}$ and/or $NH_4^{(+)}$.

7. The polymeric soil conditioner according to claim 1, wherein polymer B is a protein biopolymer selected from the group consisting of gelatin, albumin, casein and soybean protein galactomannans consisting of a mannose backbone with galactose side groups.

8. The polymeric soil conditioner according to claim 1, wherein polymer C is a galactomannan having a mannose backbone with galactose side groups that is present in the SAP mixture.

9. The polymeric soil conditioner according to claim 1, wherein the protein degrading enzyme is capable of enzymatic degradation of the protein biopolymer of polymer B used in the polymeric soil conditioner.

10. The polymeric soil conditioner according to claim 1, wherein the protein degrading enzyme is a protease, glycoside hydrolase or a combination thereof.

11. The polymeric soil conditioner according to claim 1, which is capable of absorbing between 50 to over six hundred times its weight in water.

12. The polymeric soil conditioner according to claim 1, which has
a water absorbency of between 50 and 600 times its weight, with said SAP mixture being present in an amount from about 1% based on total dry weight.

13. A method of preparing the polymeric soil conditioner composition of claim 1, the method comprising:
(i) preparing an aqueous solution of synthetic polymer A in cationic salt form, having a viscosity higher than 70,000 cPs,
(ii) preparing an aqueous solution of polymer B,
(iii) optionally preparing an aqueous solution of polymer C,
(iv) preparing an aqueous viscous solution of a mixture of the aqueous solutions of polymer A, polymer B and optionally polymer C (A:B or A:B:C), wherein polymer A is in salt form, and said mixture of polymers in solution form has a viscosity higher than 100,000 cPs;
(v) exposing the aqueous viscous solution of polymers obtained in step (iv) to an extruder to obtain a solid material with a humidity content of 5-10%;
(vi) grinding the resulting dried material to obtain a granular material with particle dimensions in the range of 0.3-3 mm that is correlated with the intended use e.g. in agriculture as a soil conditioner;
(vii) exposing the dried granular material containing polymer composition (A:B or A:B:C) obtained in step (vi) above to a thermal treatment that promotes a crosslinking reaction between the polymers A and B or polymers A, B and/or C in the composition;
(viii) cooling the granular material to room temperature; and
(ix) applying a solution of a protein degrading enzyme to the granular material to obtain the polymeric soil conditioner.

14. The method according to claim 13, wherein the aqueous solution of polymer C is prepared in step (iii) and mixed with polymer A and polymer B in step (iv).

\* \* \* \* \*